United States Patent
Lee et al.

(10) Patent No.: US 11,081,795 B2
(45) Date of Patent: Aug. 3, 2021

(54) ANTENNA STRUCTURE AND ELECTRONIC DEVICE INCLUDING THE SAME

(71) Applicant: Samsung Electronics Co., Ltd., Suwon-si (KR)

(72) Inventors: Byung Su Lee, Daegu (KR); Jung Hui Park, Pohang-si (KR); Se Ick Park, Seoul (KR); Sang Min Lee, Daegu (KR); Chui Hyung Yang, Gumi-si (KR); Ji Woo Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/537,908

(22) Filed: Aug. 12, 2019

(65) Prior Publication Data

US 2019/0372228 A1    Dec. 5, 2019

Related U.S. Application Data

(62) Division of application No. 15/192,401, filed on Jun. 24, 2016, now abandoned.

(30) Foreign Application Priority Data

Aug. 10, 2015  (KR) .......................... 10-2015-0112539

(51) Int. Cl.
*H01Q 7/00* (2006.01)
*H04B 5/00* (2006.01)
(Continued)

(52) U.S. Cl.
CPC ............. *H01Q 7/00* (2013.01); *H01Q 1/2225* (2013.01); *H01Q 1/243* (2013.01); *H01Q 5/321* (2015.01);
(Continued)

(58) Field of Classification Search
CPC ................................. H02J 50/005; H01Q 7/00
See application file for complete search history.

(56) References Cited

U.S. PATENT DOCUMENTS

| 6,924,777 B2 | 8/2005 | Reasoner et al. |
| 7,421,245 B2 | 9/2008 | Lieffort et al. |
| | (Continued) | |

FOREIGN PATENT DOCUMENTS

| CN | 1954462 A | 4/2007 |
| CN | 203326090 U | 12/2013 |
| | (Continued) | |

OTHER PUBLICATIONS

Wikipedia contributors. "Near-field communication." Wikipedia, The Free Encyclopedia. Wikipedia, The Free Encyclopedia, Mar. 9, 2020. Web. Mar. 12, 2020. (Year: 2020).*

(Continued)

*Primary Examiner* — Daniel Cavallari
(74) *Attorney, Agent, or Firm* — Jefferson IP Law, LLP

(57) ABSTRACT

An electronic device is provided. The electronic device includes a communication circuit configured to communicate with an external device, and a processor configured to control the communication circuit, wherein the communication circuit includes a coil antenna including a first coil of a loop type which rotates with a number of times in a first direction, and a second coil of a loop type which is extended from the first coil, configured to rotate with a number of times in a second direction, and spaced from the first coil by a specific distance, and an antenna control circuit electrically connected with the coil antenna and configured to transmit or receive a signal with the coil antenna.

24 Claims, 19 Drawing Sheets

(51) Int. Cl.
*H01Q 1/24* (2006.01)
*H01Q 5/321* (2015.01)
*H01Q 1/22* (2006.01)
*H02J 50/00* (2016.01)

(52) U.S. Cl.
CPC .......... *H04B 5/0031* (2013.01); *H02J 50/00* (2016.02); *H02J 50/005* (2020.01)

(56) References Cited

U.S. PATENT DOCUMENTS

| | | |
|---|---|---|
| 7,696,884 B2 | 4/2010 | Luo et al. |
| 8,378,917 B2 | 2/2013 | Yoneda et al. |
| 8,487,831 B2 | 7/2013 | Yoshida et al. |
| 8,742,895 B2 | 6/2014 | Yoshida et al. |
| 8,743,006 B2 | 6/2014 | Yoshida et al. |
| 9,125,007 B2 | 9/2015 | Konanur et al. |
| 9,146,054 B2 | 9/2015 | Moezidis et al. |
| 9,166,276 B2 | 10/2015 | Chateau et al. |
| 9,361,574 B2 | 6/2016 | Yoshida et al. |
| 9,438,313 B2 | 9/2016 | Jang et al. |
| 9,661,446 B2 | 5/2017 | Konanur et al. |
| 9,761,928 B2 | 9/2017 | Han et al. |
| 9,800,295 B2 | 10/2017 | Jang et al. |
| 10,148,001 B2 | 12/2018 | Han et al. |
| 10,475,571 B2 | 11/2019 | Jang |
| 10,477,743 B2 | 11/2019 | Jang et al. |
| 10,483,625 B2 | 11/2019 | Han et al. |
| 2004/0183743 A1 | 9/2004 | Reasoner et al. |
| 2005/0186902 A1 | 8/2005 | Lieffort et al. |
| 2007/0222602 A1 | 9/2007 | Luo et al. |
| 2010/0194660 A1 | 8/2010 | Yoneda et al. |
| 2010/0277383 A1 | 11/2010 | Autti et al. |
| 2012/0080445 A1 | 4/2012 | Moezidis et al. |
| 2014/0002225 A1 | 1/2014 | Konanur et al. |
| 2014/0117927 A1 | 5/2014 | Chateau et al. |
| 2014/0256251 A1 | 9/2014 | Caceres et al. |
| 2014/0349572 A1 | 11/2014 | Ben-Shalom et al. |
| 2015/0044963 A1 | 2/2015 | Konanur et al. |
| 2015/0138034 A1 | 5/2015 | Su et al. |
| 2015/0171519 A1 | 6/2015 | Han et al. |
| 2015/0180542 A1 | 6/2015 | Jang et al. |
| 2015/0381239 A1 | 12/2015 | Shostak |
| 2016/0066128 A1 | 3/2016 | Konanur et al. |
| 2016/0359527 A1 | 12/2016 | Jang et al. |
| 2017/0179573 A1 | 6/2017 | Konanur et al. |
| 2018/0198305 A1 | 7/2018 | Hwang et al. |
| 2019/0148988 A1 | 5/2019 | Hwang et al. |
| 2020/0052385 A1* | 2/2020 | Han ................ H01Q 7/06 |

FOREIGN PATENT DOCUMENTS

| | | |
|---|---|---|
| CN | 104205491 A | 12/2014 |
| EP | 2 144 328 A1 | 1/2010 |
| KR | 10-2013-0133178 A | 12/2013 |
| KR | 10-2014-0010063 A | 1/2014 |
| KR | 10-2014-0021695 A | 2/2014 |
| KR | 10-2014-0110185 A | 9/2014 |
| KR | 10-1594380 B1 | 2/2016 |

OTHER PUBLICATIONS

Chinese Office Action with English translation dated Jun. 3, 2020; Chinese Appln No. 201680047234.9.
Indian Office Action dated Jun. 10, 2020; Indian Appln. No. 201817006657.
Lee et al.; Multi-functional high-isolation dual antenna for controllable wireless charging and NFC communication; IEE Electronics Letters; vol. 50, No. 13, pp. 912-913; XP6048752; Jun. 19, 2014.
European Search Report dated Dec. 23, 2020; European Appln. No. 16 835 300.1-1205.

* cited by examiner

ANTENNA STRUCTURE AND ELECTRONIC DEVICE INCLUDING THE SAME

CROSS-REFERENCE TO RELATED APPLICATION(S)

This application is a divisional application of prior application Ser. No. 15/192,401, filed on Jun. 24, 2016 which was based on and claimed priority under 35 U.S.C. § 119(a) of a Korean patent application number 10-2015-0112539, filed on Aug. 10, 2015 in the Korean Intellectual Property Office, the entire disclosure of which is incorporated by reference herein in its entirety.

TECHNICAL FIELD

The present disclosure relates to an antenna structure and an electronic device including the antenna structure.

BACKGROUND

Stirred up with advancement of electronic technology, electronic devices are developed and spread over in a diversity of kinds. Especially, portable electronic devices, such as smartphones, laptop computers, tablet personal computers, wearable computers, and so on, are increasingly distributed in a variety of applications. Electronic devices recently launched into the market are designed to support many types of wireless communication schemes to provide diverse services for users. As the wireless communication technology is variable in accordance with types, electronic devices usually includes a multiplicity of antennas for supporting various kinds of wireless communication schemes. Local-area wireless communications, such as near field communication (NFC), magnetic secure transmission (MST), or wireless communication, could encounter areas which are troubling communication depending on locations. Because of that, there could be the case of interrupting communication depending on distances, locations, or angles between an electronic device and an external device. Moreover, in the case that a plurality of devices is placed around an electronic device, only one of the plural devices is recognized but the other is not done.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an antenna structure, and an electronic device including the antenna structure, for improving communication performance in range and distance by modifying a structure of antenna for local-area wireless communication.

Another aspect of the present disclosure is to provide an antenna structure, and an electronic device including the antenna structure, for recognizing at least one of devices which are placed around the electronic device.

In accordance with an aspect of the present disclosure, an electronic device is provided. The electronic device includes a communication circuit configured to communicate with an external device, and a processor configured to control the communication circuit, wherein the communication circuit may include a coil antenna including a first coil of a loop type that rotates with a first number of rotation times in a first direction, and a second coil of a loop type that is extended from the first coil, configured to rotate with a second number of rotation times in a second direction, and spaced from the first coil by a specific distance, and an antenna control circuit electrically connected with the coil antenna and configured to transmit or receive a signal with the coil antenna.

In accordance with another aspect of the present disclosure, an antenna structure is provided. The antenna structure includes at least one printed circuit board, and a coil antenna arranged on the at least one printed circuit board, wherein the coil antenna may include a first coil of a loop type configured to rotate with a first number of rotation times in a first direction, and a second coil of a loop type extended from the first coil, configured to rotate with a second number of rotation times in a second direction, and spaced from the first coil by a specific distance.

In accordance with still another aspect of the present disclosure, an electronic device is provided. The electronic device includes a housing including a first surface toward a first direction and a second surface toward a second direction that is opposite to the first direction, at least one communication circuit included in the housing, a wireless charging circuit included in the housing, a printed circuit board included in the housing and configured to have a surface parallel with the first surface or the second surface, a first coil having a first diameter in view of the top of the second surface and including at least one turn, a second coil configured to have a second diameter, which is smaller than the first diameter, in view of the top of the second surface, arranged in an interior surrounded by the turns of the first coil, and configured to include at least one turn, and a third coil configured to have a third diameter, which is smaller than the second diameter, in view of the top of the second surface, arranged in an interior surrounded by the turns of the second coil, and configured to include at least one turn, wherein the first coil, the second coil, and the third coil may be arranged in or adjacent to the printed circuit board, wherein the first coil and the third coil may be electrically connected with the communication circuit, and wherein the second coil is electrically connected with the wireless charging circuit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
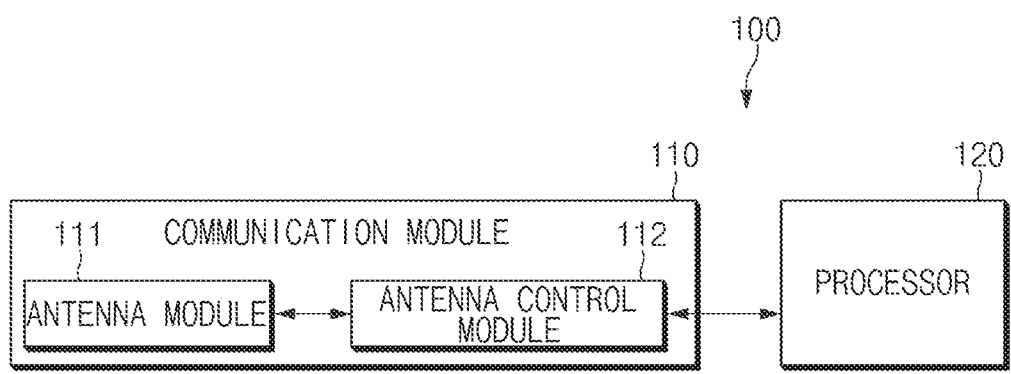
FIG. 1 is a bock diagram illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. The terms "have", "may have", "include", "may include", "comprise", or "may comprise" used herein indicate existence of corresponding features (e.g., numerical values, functions, operations, or components) but does not exclude other features.

As used herein, the terms "A or B", "at least one of A or/and B", or "one or more of A or/and B" may include all allowable combinations which are enumerated together. For example, the terms "A or B", "at least one of A and B", or "at least one of A or B" may indicate all cases of: (1) including at least one A, (2) including at least one B, or (3) including both at least one A, and at least one B.

As used herein, the terms such as "1st", "2nd", "first", "second", and the like may be used to qualify various elements regardless of their order and/or priority, simply differentiating one from another, but do not limit those elements thereto. For example, both a first user device and a second user device indicate different user devices. For example, a first element may be referred to as a second element and vice versa without departing from the scope of the present disclosure.

As used herein, if one element (e.g., a first element) is referred to as being "operatively or communicatively connected with/to" or "connected with/to" another element (e.g., a second element), it should be understood that the former may be directly coupled with the latter, or connected with the latter via an intervening element (e.g., a third element). Otherwise, it will be understood that if one element is referred to as being "directly coupled with/to" or "directly connected with/to" with another element, it may be understood that there is no intervening element (e.g., a third element) existing between them.

In the description or claims, the term "configured to" (or "set to") may be changeable with other implicative meanings such as "suitable for", "having the capacity to", "designed to", "adapted to", "made to", or "capable of", and may not simply indicate "specifically designed to". Alternatively, in some circumstances, a term "a device configured to" may indicate that the device "may do" something together with other devices or components. For instance, a term "a processor configured to (or set to) perform A, B, and C" may indicate a generic-purpose processor (e.g., central processing unit (CPU) or application processor (AP)) capable of performing its relevant operations by executing one or more software or programs which is stored in an exclusive processor (e.g., embedded processor), which is prepared for the operations, or in a memory.

It will be further understood that terms, which are defined in a dictionary and commonly used, should also be interpreted as is customary in the relevantly related art and not in an idealized or overly formal detect unless expressly so defined herein in various embodiments of the present disclosure. In some cases, terms even defined in the specification may not be understood as excluding embodiments of the present disclosure.

An electronic device according to various embodiments of the present disclosure may include, for example, at least one of smartphones, tablet personal computers (tablet PCs), mobile phones, video telephones, electronic book readers, desktop PCs, laptop PCs, netbook computers, workstations, servers, personal digital assistants (PDA), portable multimedia players (PMP), Moving Picture Experts Group phase 1 or phase 2 (MPEG-1 or MPEG-2) audio layer 3 (MP3)

players, mobile medical devices, cameras, wearable devices. According to various embodiments, the wearable devices may include at least one of accessories (e.g., watches, rings, bracelets, anklets, necklaces, glasses, contact lenses, or head-mounted devices (HMD)), assembled textiles or clothes (e.g., electronic apparel), body-attachable matters (e.g., skin pads or tattoos), or implantable devices (e.g., implantable circuits).

In some embodiments, an electronic device may be a smart home appliance. The smart home appliance, for example, may include at least one of televisions (TV), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, Google TV™, and the like), game consoles (e.g., Xbox™, PlayStation™, and the like), electronic dictionaries, electronic keys, camcorders, electronic picture frames, and the like.

In other embodiments, an electronic device may include at least one of diverse medical devices (e.g., portable medical measuring instruments (blood-sugar measuring instruments, heart-pulsation measuring instruments, blood-pressure measuring instruments, or body-temperature measuring instruments), magnetic resonance angiography (MRA) equipment, magnetic resonance imaging (MRI) equipment, computed tomography (CT) equipment, scanners, and ultrasonic devices), navigation device, global positioning system (GPS) receiver, event data recorder (EDR), flight data recorders (FDR), vehicle infotainment devices, electronic equipment for vessels (e.g., navigation systems and gyrocompasses), avionics, security devices, head units for vehicles, industrial or home robots, automatic teller's machines (ATM) for financial agencies, points of sales (POS) for stores, and internet of things (e.g., electric bulbs, diverse sensors, electric or gas meter, spring cooler units, fire alarms, thermostats, road lamps, toasters, exercise implements, hot water tanks, boilers, and the like).

According to some embodiments, an electronic device may include at least one of parts of furniture or buildings/structures having communication functions, electronic boards, electronic-signature receiving devices, projectors, and diverse measuring instruments (e.g., water meters, electricity meters, gas meters, and wave meters) including metal cases. In various embodiments, an electronic device may be one or more combinations of the above-mentioned devices. Electronic devices according to some embodiments may be flexible electronic devices. Additionally, electronic devices according to various embodiments of the present disclosure may not be restrictive to the above-mentioned devices, rather may include new electronic devices emerging by way of technical development.

Hereinafter, an electronic device according to various embodiments will be described in conjunction with the accompanying drawings. In description for various embodiments, the term "user" may refer to a person using an electronic device or a device (e.g., an artificial intelligent electronic device) using an electronic device.

FIG. 1 is a bock diagram illustrating a configuration of an electronic device according to various embodiments of the present disclosure.

Referring to FIG. 1, an electronic device 100 may include a communication module 110 and a processor 120.

The communication module (or communication circuit) 110 may communicate with an external device. According to an embodiment, the communication module 110 may include an antenna module 111 and an antenna control module (or antenna control circuit) 112.

According to an embodiment, the antenna module 111 may transmit or receive a signal with an external device under control of the antenna control circuit 112. The antenna module 111 may include, for example, a transceiver, a power amp module (PAM), a frequency filter, a low noise amplifier (LNA), or an antenna (e.g., coil antenna or metallic antenna). According to an embodiment, the antenna module 111 may be a near field communication (NFC) antenna which is set with a resonance frequency for NFC. For example, the antenna module 111 may communicate with an NFC reader, an NFC tag, or an external electronic device in NFC communication.

According to an embodiment, the antenna control module 112 may include a processor for processing data which are sent or received through the antenna module 111. According to an embodiment, the antenna control module 112 may supply a signal, which is to be sent, to the antenna module 111, and may analyze a signal which is received into the antenna module 111 from the external device. According to an embodiment, the antenna control module 112 may be an NFC module for performing NFC communication. According to an embodiment, the antenna control nodule may be implemented in a chip (e.g., integrated circuit (IC) chip) which is designed to perform NFC communication. According to an embodiment, the antenna control module 112 may operate in a read/write mode, a card emulation mode, or a peer-to-peer (P2P) mode. According to an embodiment, the antenna control module 112 may change an operating mode under control of the processor 120.

According to an embodiment, the processor 120 may control an overall operation of the electronic device 100. According to an embodiment, the processor 120 may control the antenna control module 112 to transmit or receive data with an external device. According to an embodiment, the processor 120 (e.g., AP) may be implemented in system-on-chip (SoC) including a CPU, a graphics processing unit (GPU), a video processor, and a memory.

Figure 2:
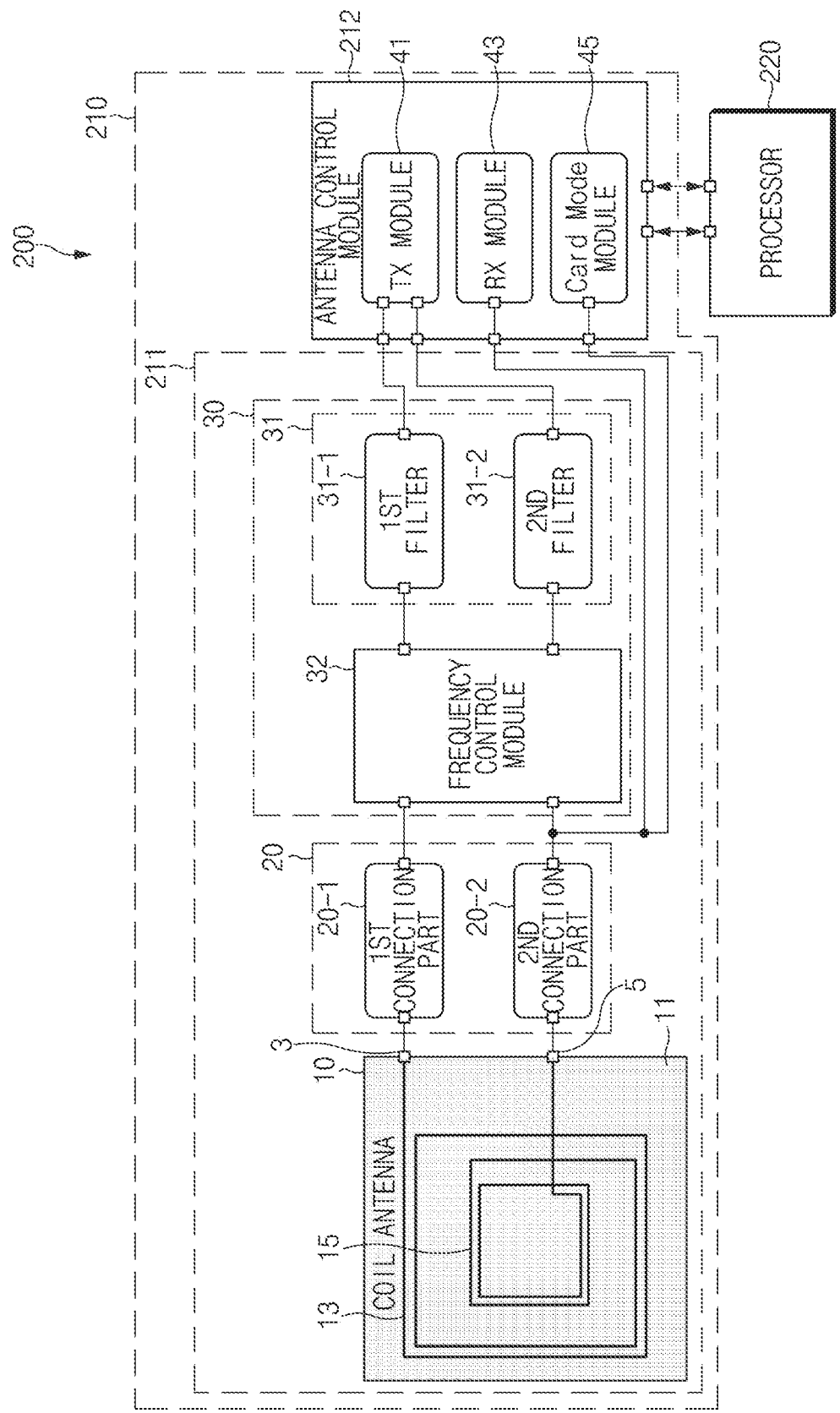
FIG. 2 is a bock diagram illustrating a configuration of an electronic device according to various embodiments of the present disclosure.

FIG. 2 is a bock diagram illustrating a configuration of an electronic device according to various embodiments of the present disclosure.

Referring to FIG. 2, an electronic device 100 (e.g., the electronic device 100 of FIG. 1) may include a communication module (e.g., the communication module 110) and a processor 220 (e.g., the processor 120 of FIG. 1).

According to an embodiment, the communication module 210 may include an antenna module 210 (e.g., the antenna module 111 of FIG. 1) and an antenna control module (e.g., the antenna control module of FIG. 1). According to an embodiment, the antenna module 211 may include a coil antenna 10, a connection part 20, and a signal processing module 30.

According to an embodiment, the coil antenna 10 may include a plurality of coils. The coil antenna 10 may include, for example, a first coil 13 and a second coil 15. According to an embodiment, the first coil 13 may be shaped in a loop which rotates with a specific number of rotation times in a specific direction. According to an embodiment, the second coil 15 may be shaped in a loop which is extended from the first coil 13 and rotates with a specific number of rotation times in a specific direction. For example, the first coil 13 may be electrically connected with the second coil 15.

According to an embodiment, each end of the first coil 13 and the second coil 15 may be connected with an input terminal. For example, an end of the coil 13 may be connected with a first input terminal 3 and an end of the second coil 15 may be connected with a second input terminal 5. The first coil 13 and the second coil 15 may input/output (I/O) signals respectively through the first input terminal 3 and the second input terminal 5.

According to an embodiment, at least one coil included in the coil antenna 10 may be formed on the same surface (or one surface). For example, the first coil 13 and the second coil 15 may be formed in at least a partial area of the same printed circuit board (e.g., flexible printed circuit board (FPCB)). Forming the first coil 13 and the second coil 15 may mean, for example, the case of forming different layers in the same printed circuit board when the printed circuit board includes at least one layer, as well as the case of forming them in a perfectly same surface. According to an embodiment, the second coil 15 may form a loop, which is smaller than a loop formed by the first coil 13, in the loop formed by the first coil 13.

According to an embodiment, the first coil 13 and the second coil 15 may be arranged in a distance equal to or larger than a specific distance between them. For example, the second coil 15 may be arranged to allow strength of a magnetic field, which is formed in a loop formed by the first coil 13, to be equal to or larger than specific strength throughout all areas. The inner area of a loop formed by the first coil 13 may include an area where strength of a magnetic field does not satisfy the specific condition. According to an embodiment, the second coil 15 may be arranged in at least a partial area having strength of a magnetic field which does not satisfy a specific condition. For example, the second coil 15 may be arranged to allow communication in an area where strength of a magnetic field of a loop formed by the coil 13 does not satisfy a specific condition.

According to an embodiment, the first coil 13 and the second coil 15 may be the same in a rotation direction. For example, the first coil 13 and the second coil 15 may be arranged to have the same current direction along the coils. For example, if a current flowing through the first coil 13 circles clockwise, a current flowing through the second coil 15 may circle clockwise. As another example, if a current flowing through the first coil 13 circles anticlockwise, a current flowing through the second coil 15 may circle anticlockwise. In the case that the first coil 13 and the second coil 15 are the same in a rotation direction, a magnetic field formed by the first coil 13 may be superposed on a magnetic field formed by the second coil 15, thereby maximizing strength of the magnetic field formed around the coils.

According to an embodiment, the first coil 13 and the second coil 15 may be the same in a number of rotation times. For example, in the case that the first coil 13 and the second coil 15 are the same in the number of rotation times, strength of a magnetic field may be maximized.

TABLE 1

|  |  | Tag recognition distance | |
| --- | --- | --- | --- |
| 1st coil | 2nd coil | MN910 Small Tag | TEC-TILE Small Tag |
| L2 | R1 | 17 mm | 13 mm |
| R2 | R1 | 19 mm | 14 mm |
| R2 | R2 | 21 mm | 17 mm |
| R3 | R3 | 24 mm | 18 mm |
| R3 | R2 | 21 mm | 17 mm |

Table 1 summarizes experimental data indicating NFC tag recognition distances by rotation directions and the numbers of rotation times according to various embodiments of the present disclosure.

The alphabet characters and numerals marked on the first and second columns indicate rotation directions and the numbers of rotation times of the coils. For example, L2 denotes the case that the coil rotates with two times in the left direction. As another example, L3 denotes the case that the coil rotates with three times in the right direction.

Referring to Table 1 according to various embodiments, if the coils rotate in the reverse direction even with the same number of rotation times, a tag recognition distance may be shorter. In the case that the first coil 13 and the second coil 15 are the same in a number of rotation times, a tag recognition distance for the same number of rotation times may be longer. According to various embodiments, in the case that the first coil 13 and the second coil 15 are the same in a rotation direction and the number of rotation times, a tag recognition distance may be maximized.

According to an embodiment, the first coil 13 and the second coil 15 may be adjusted in the number of rotation times to allow a tag to be recognized in a loop formed by the first coil 13 (or to prevent a service-impossible area from existing) in accordance with positions of the first coil 13 and the second coil 15.

According to various embodiments, in the case that the antenna control module 212 (e.g., NFC module) operates in a reader mode, strength of a magnetic field becomes higher as large as the numbers of rotation times of the first coil 13 and the second coil 15, thus raising tag recognition performance. Otherwise, in the case that the antenna control module 212 operates in a card mode, the tag recognition performance may be lower due to confliction with a magnetic field which is generated from an NFC reader. According to various embodiments, the numbers of rotation times of the first coil 13 and the second coil 15 may be determined in consideration of all factors about the performance of the reader mode and the card mode.

According to various embodiments, the connection part 20 may electrically connect the coil antenna 10 with another element (e.g., the signal processing module 30 or the antenna control module 212). According to an embodiment, the connection part 20 may include a C-clip. According to an embodiment, the connection part 20 may include a first connection part 20-1 and a second connection part 20-2. According to an embodiment, the first connection part 20-1 may electrically connect an end (or the first input terminal 3) of the first coil 13 with the signal processing module 30. According to an embodiment, the second connection part 20-2 may electrically connect an end (or the second input terminal 5) of the second coil 15 with the signal processing module 30 or the antenna control module 212.

According to various embodiments, the signal processing module 30 may process and convey a signal, which is received from the antenna control module 212, to the coil antenna 10. According to an embodiment, the signal processing module 31 may include a filter module 31 and/or a frequency control module 32.

According to an embodiment, the filter module 31 may filter and convey a signal, which is received from the antenna control module 212, to the frequency control module 32. For example, the filter module 31 may filter a signal, which is received from the antenna control module 212, and then may convey only a specific frequency band signal to the frequency control module 32. According to an embodiment, filter module 31 may include a plurality of filters such as a first filter 31-1 and a second filter 31-2. According to an embodiment, the filter module 31 may include a low pass filter. According to an embodiment, the filter module 31 may include a band pass filter or a band reflection filter.

According to various embodiments, the frequency control module 32 may control a resonance frequency of the coil antenna 10. According to an embodiment, the frequency control module 32 may include a resistor, an inductor, and a capacitor (RLC) element (or RLC circuit). The frequency control module 32 may adjust a resonance frequency of the coil antenna 10 by using the RLC circuit. For example, the frequency control module 32 may adjust a resonance antenna of the coil antenna to an NFC communication frequency (e.g., 13.56 MHz). According to an embodiment, the frequency control module 212 may optimize operation circumstances by adjusting a resonance frequency in accordance with an operation mode (e.g., reader mode or card mode).

According to an embodiment, the antenna control module 212 may supply a signal, which is to be sent to an external device, to the antenna module 211 and may receive and analyze a signal which is received to the antenna module 211 from an external device.

According to an embodiment, the antenna control module 212 (e.g., NFC module) may operate in at least one of a reader mode, a card reader, and a P2P mode under control of the processor 220. According to an embodiment, the antenna control module 212 may include a transmitter X-tal (TX) 41, a receive X-tal (RX), and/or a card mode module 45. According to an embodiment, in the case that the antenna control module 212 operates in a reader mode and/or a P2P mode, the TX module 41 and/or the RX module 43 may be activated. According to an embodiment, in the case that the antenna control module 212 operates in a card mode, the card mode module 45 may be activated.

According to an embodiment, the TX module 41 may generate a signal which is to be sent to the antenna module 211. For example, the TX module 41 may generate a signal according to NFC protocol. According to an embodiment, the TX module 41 may include an encoder for encoding a generated signal. According to an embodiment, the TX module 41 may include an amplifier for amplifying power of a generated signal. A signal generated from the TX module 41 may be conveyed to the antenna module 211 (e.g., the signal processing module 31).

According to an embodiment, the RX module 43 mat receive a signal, which is output to the antenna module 211 from the TX module 41. A signal received from the antenna module 211 may include data which is received from an NFC tag or an external device. According to an embodiment, the RX module 43 may include a decoder for decoding a received signal. According to an embodiment, the RX module 43 may convey information, which is included in a received signal, into the processor 220.

According to an embodiment, the card mode module 45 may receive a signal which is received from an external device (e.g., POS) in the state that the antenna control module 112 is operating in a card mode.

According to an embodiment, the antenna control module 212 may include at least one terminal (e.g., an input terminal or an output terminal) for sending or receiving a signal with an external device (e.g., the antenna module 211 or the processor 220). For example, the antenna control module 212 may include a first terminal and a second terminal which are connected with the TX module 41. The first terminal may be connected with, for example, the first input terminal 3 of the coil antenna 10. The second terminal may be connected with, for example, the second input terminal 5 of the coil antenna 10.

Figure 3:
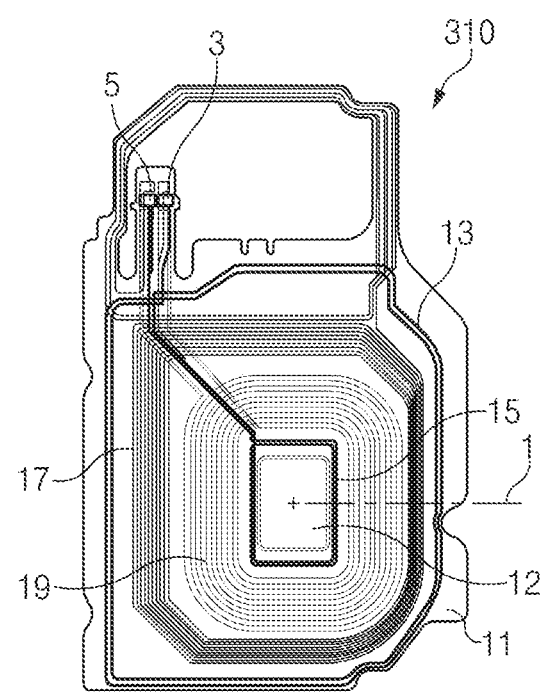
FIG. 3 illustrates a structure of a coil antenna according to various embodiments of the present disclosure.

FIG. 3 illustrates a structure of a coil antenna according to various embodiments of the present disclosure.

Referring to FIG. 3, a coil antenna 310 (e.g., the coil antenna 10 of FIG. 2) may include a printed circuit board 11 (e.g., FPCB). According to an embodiment, the coil antenna 310 may include at least one coil which is formed in at least a partial area of the printed circuit board 11. According to an embodiment, the coil antenna 310 may include a first coil 13 (e.g., the first coil 13 of FIG. 2) and a second coil 15 (e.g., the second coil 15 of FIG. 2). According to an embodiment, the first coil 13 may be shaped in a loop which rotates with a specific number of rotation times in a specific direction. According to an embodiment, the second coil 15 may be shaped in a loop which is extended from the first coil 13 and rotates with a specific number of rotation times in a specific direction. According to an embodiment, the first coil 13 and the second coil 15 may form an antenna for NFC communication.

According to an embodiment, the coil antenna 310 may include a third coil 17 and a fourth coil 19 which are formed in at least a partial area of the printed circuit board 11. According to an embodiment, the third coil 17 and the fourth coil 19 may be used for magnetic secure transmission (MST) and wireless power consortium (WPC) or power matters alliance (PMA). According to an embodiment, the third coil 17 and the fourth coil 19 may be electrically connected with an MST module (or MST circuit) and a wireless charge module (or wireless charging circuit) to I/O a signal.

According to an embodiment, each end of the first coil 13 and the second coil 15 may be connected with an input terminal. For example, an end of the first coil 13 may be connected with the first input terminal 13 (e.g., the first input terminal 3 of FIG. 2) and an end of the second coil 15 may be connected with the second input terminal 5 (e.g., the second input terminal 5 of FIG. 2). The first coil 13 and the second coil 15 may respectively I/O a signal through the first input terminal 3 and the second input terminal 5.

According to an embodiment, the third coil 17 may be smaller than the first coil 13 in diameter and may be placed in a loop formed by the first coil 13. According to an embodiment, the fourth coil 19 may be smaller than the third coil 17 in diameter and may be placed in a loop formed by the third coil 17. According to an embodiment, the second coil 15 may be smaller than the third coil 17 in diameter and may be placed in a loop formed by the third coil 17.

According to an embodiment, the coil antenna 310 may include an attractor 12. According to an embodiment, the attractor 12 may be placed in a loop formed by the second coil 15. According to an embodiment, the attractor 12 may include a magnetic component. According to an embodiment, the attractor 12 may couple an electronic device (the electronic device 100 of FIG. 1) and a wireless charge device.

At least one coil (e.g., the first coil to the fourth coil) formed in at least a partial area of the printed circuit board 11 may be variably shaped in addition to the shape shown in FIG. 2.

Figure 4:
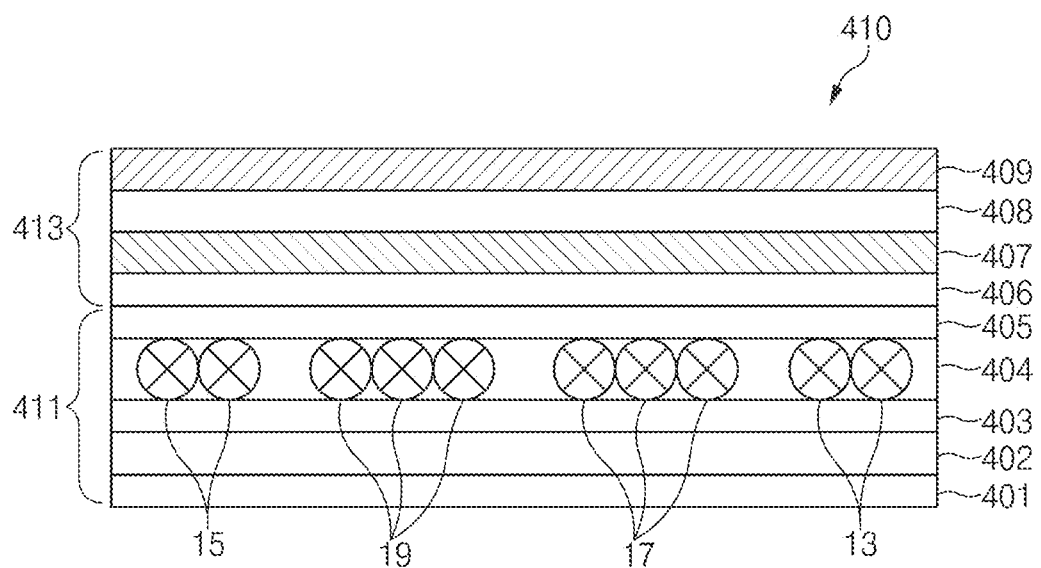
FIG. 4 illustrates a section of a coil antenna according to various embodiments of the present disclosure.

FIG. 4 illustrates a section of a coil antenna according to various embodiments of the present disclosure.

Referring to FIG. 4, the section of a coil antenna 410 shown in FIG. 4 may correspond to a part of a section taken from the coil antenna shown in FIG. 3. For example, the section of the coil antenna 410 shown in FIG. 4 may correspond to at least a part of a section taken by a line 1 from the coil antenna 310 of FIG. 3.

Referring to FIG. 4, the coil antenna 410 may include a printed circuit board layer 411 and a protection sheet layer 413. According to an embodiment, the printed circuit board layer 411 may be a FPCB layer. According to an embodiment, the printed circuit board layer 411 may include a first cover layer 401, a first coil layer 402, a base film 403, a second coil layer 404, and a second cover layer 405.

According to an embodiment, the first cover layer 401 may be arranged at the lowest side of the printed circuit board layer 411 to protect the printed circuit board layer 411 from the outside and to electrically isolate the first coil layer 402 from the outside.

According to an embodiment, the second cover layer 405 may be arranged at the lowest side of the printed circuit board layer 411 to protect the printed circuit board layer 411 from the outside and to electrically isolate the second coil layer 404 from the outside.

According to an embodiment, the first coil layer 402 may be arranged on the top surface of the first cover layer 401. According to an embodiment, the second coil layer 404 may be arranged on the bottom surface of the second cover layer 405. According to an embodiment, the first coil layer 402 and the second coil layer 404 may include a conductive material (e.g., copper) and may include at least one coil which is printed on the conductive material. According to an embodiment, the first coil layer 402 and the second coil layer 404 may include at least one of a first coil 13, a second coil 15, a third coil 17, and a fourth coil 19. Although the embodiment described in conjunction with FIG. 4 is illustrated as the second coil layer 404 includes the first coil 13, the second coil 15, the third coil 17, and the fourth coil 19, at least one of the first coil 13, the second coil 15, the third coil 17, and the fourth coil 19 may be included even in the first coil antenna 402.

According to an embodiment, the base film 403 may be placed between the first coil layer 402 and the second coil layer 404. According to an embodiment, the base film 403 may electrically isolate the first coil layer 402 and the second coil 404 each other.

According to an embodiment, the protection sheet layer 413 may include a first adhesive layer 406, a ferrite sheet 407, a second adhesive layer 408, and a graphite sheet 409.

According to an embodiment, the first adhesive layer 405 may stick the ferrite sheet 407 and the printed circuit board layer 411 each other. For example, the first adhesive layer 406 may stick the ferrite sheet 407 to the first adhesive layer 405 of the printed circuit board layer 411.

According to an embodiment, the ferrite sheet 407 may shield an electronic wave which is generated during a wireless charging operation. According to an embodiment, the first adhesive layer 408 may stick the ferrite sheet 407 to the graphite sheet 409.

According to an embodiment, the graphite sheet 409 may shield heat which can be generated during a wireless charging operation.

Figure 5:
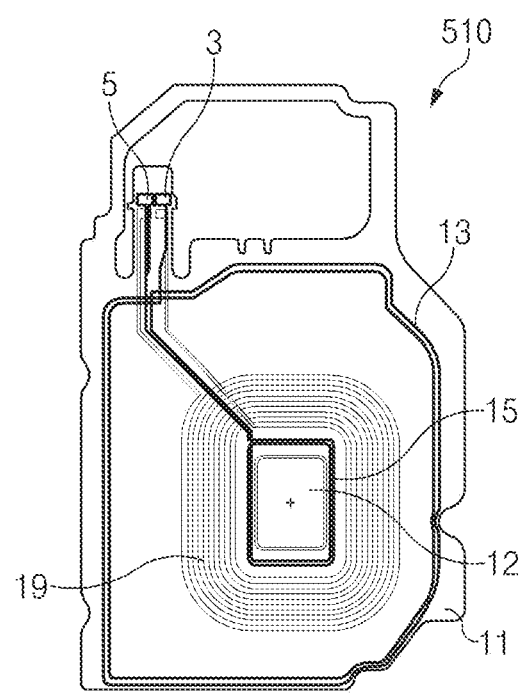
FIG. 5 illustrates a structure of a coil antenna according to various embodiments of the present disclosure.

FIG. 5 illustrates a structure of a coil antenna according to various embodiments of the present disclosure.

Referring to FIG. 5 according to various embodiments, a coil antenna 510 (the coil antenna 10 of FIG. 2) may include a printed circuit board 11 (e.g., the printed circuit board 11 of FIG. 2; FPCB). According to an embodiment, the coil antenna 510 may include a plurality of coils formed in at least a partial area of the printed circuit board 11. According to an embodiment, the coil antenna 510 may include a first coil 13 (e.g., the first coil 13 of FIG. 2) and a second coil 15 (e.g., the second coil 15 of FIG. 2). According to an embodiment, the first coil 13 may be shaped in a loop which rotates with a specific number of rotation times in a specific direction. According to an embodiment, the second coil 15 may be shaped in a loop which is extended from the first coil 13 and rotates with a specific number of rotation times in a specific direction. According to an embodiment, the first coil 13 and the second coil 15 may form an antenna for NFC communication.

According to an embodiment, each end of the first coil 13 and the second coil 15 may be connected with an input terminal. For example, an end of the first coil 13 may be connected with a first input terminal 3 (e.g., the first input terminal 3 of FIG. 2) and an end of the second coil 15 may be connected with a second input terminal 5 (e.g., the second input terminal 5 of FIG. 2). The first coil 13 and the second coil 15 may I/O a signal respectively through the first input terminal 3 and the second input terminal 5.

According to an embodiment, the coil antenna 510 may include a fourth coil 19 (e.g., the fourth coil 19 of FIG. 3) which is formed in at least a partial area of the printed circuit board 11. According to an embodiment, the fourth coil 19 may be used for WPC. According to an embodiment, the fourth coil 19 may I/O a signal in electrical connection with an additional input terminal different from the first coil 13 and the second coil 15.

According to an embodiment, the fourth coil 19 may be smaller than the first coil 13 in diameter and may be formed in a loop formed by the first coil 13. According to an embodiment, the second coil may be smaller than the fourth coli 19 and may be formed in a loop formed by the fourth coil 19.

According to an embodiment, the coil antenna 510 may include an attractor 12. According to an embodiment, the attractor 12 may be placed in a loop formed by the second coil 15. According to an embodiment, the attractor 12 may include a magnetic component. According to an embodiment, the attractor 12 may combine an electronic device (e.g., the electronic device 100 of FIG. 1) and a wireless charging device during a wireless charge.

Figure 6:
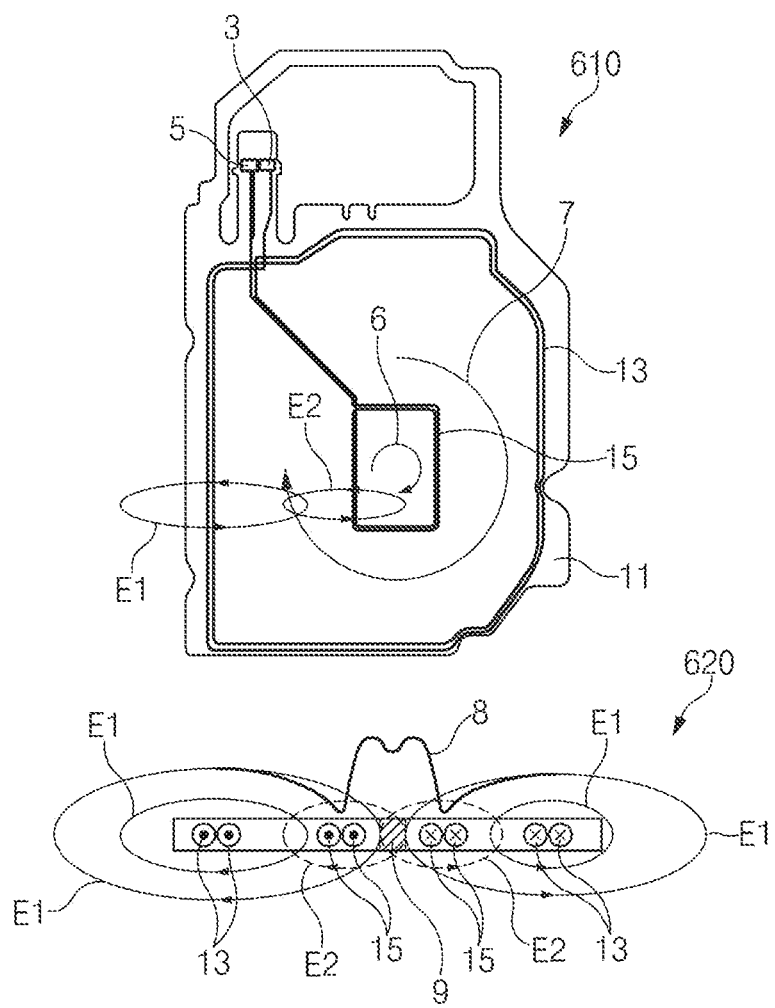
FIG. 6 illustrates a structure of a coil antenna according to various embodiments of the present disclosure.

FIG. 6 illustrates a structure of a coil antenna according to various embodiments of the present disclosure.

Referring to FIG. 6 according to various embodiments, a coil antenna 610 (the coil antenna 10 of FIG. 2) may include a printed circuit board 11 (e.g., the printed circuit board 11 of FIG. 2; FPCB). According to an embodiment, the coil antenna 610 may include a plurality of coils formed in at least a partial area of the printed circuit board 11. According to an embodiment, the coil antenna 610 may include a first coil 13 (e.g., the first coil 13 of FIG. 2) and a second coil 15 (e.g., the second coil 15 of FIG. 2). According to an embodiment, the first coil 13 may be shaped in a loop which rotates with a specific number of rotation times in a specific direction. According to an embodiment, the second coil 15 may be shaped in a loop which is extended from the first coil 13 and rotates with a specific number of rotation times in a specific direction. According to an embodiment, the first coil 13 and the second coil 15 may form an antenna for NFC communication.

According to an embodiment, each end of the first coil 13 and the second coil 15 may be connected with an input terminal. For example, an end of the first coil 13 may be connected with a first input terminal 3 (e.g., the first input terminal 3 of FIG. 2) and an end of the second coil 15 may be connected with a second input terminal 5 (e.g., the second input terminal 5 of FIG. 2). The first coil 13 and the second coil 15 may I/O a signal respectively through the first input terminal 3 and the second input terminal 5.

Referring to FIG. 6 according to various embodiments, a current (or signal) may be supplied through the second input terminal 5 which is connected with an end of the second coil 15. For example, a current input into the second input terminal 5 may flow to the right direction 6 (or clockwise)

along the second coil 15, then forming a magnetic field. The current flowing to the right direction 6 along the second coil 15 may flow to the right direction 7 along the first coil 13 connected with the second coil 15, then forming a magnetic field. The current flowing to the right direction 7 along the first coil 13 may be output to the outside of the coil antenna 610 through the first input terminal 3 connected with an end of the first coil 13. Referring to FIG. 6, the first coil 13 and the second coil 15 may be formed to be the same in a current direction.

Although FIG. 6 is illustrated as a current is supplied through the second input terminal 5, the current may be supplied even through the first input terminal 3. For example, in the case of supplying a current through the first input terminal 3, contrary to FIG. 6, the current may flow to the left direction (or anticlockwise) along the first coil 13. The current flowing along the first coil 13 may flow to the left direction (or anticlockwise) along the second coil 15 connected with the first coil 13, and may be output to the outside of the coil antenna 610 through the first input terminal 3 connected with an end of the first coil 13.

For example, if a current flows along the first coil 13 and the second coil 15, a magnetic field may be formed around the coils. FIG. 6 illustrates the coil antenna's section 620 where a magnetic field is formed according to various embodiments of the present disclosure.

Referring to FIG. 6, if a current is flowing along the first coil 13, a magnetic field E1 may be formed around the first coil 13. According to an embodiment, in the case that the coil antenna 610 includes only the first coil 13, a loop formed by the first coil 13 may include an area 9 where strength of the magnetic field E1 does not satisfy a specific condition. For example, if a tag (e.g., NFC tag) is positioned in an area where strength of the magnetic field E1 does not satisfy a specific condition, there would trouble to recognize the tag. Especially in the case with a small tag, the probability of unrecognizing the tag may be higher.

Referring to FIG. 6, if a current flows along the first coil 13 and the second coil 15, magnetic fields E1 and E2 may be formed around the first coil 13 and the second coil 15. According to an embodiment, different from the case that the coil antenna 610 includes only the first coil 13, the magnetic field E2 formed by the second coil 15 may induce an magnetic field which satisfies a specific condition in a loop formed by the first coil 13. According to an embodiment, the total strength 8 of magnetic field formed by the first coil 13 and the second coil 15 may be maximized around the second coil 15 due to superposition with the magnetic field E1, which is formed by the first coil 13, and the magnetic field 15 formed by the second coil 15. Accordingly, in the case that the coil antenna 610 includes the first coil 13 and the second coil 15, tag recognition distance and range may increase to stably improve tag recognition performance regardless of a tag size.

According to an embodiment, the second coil 15 may be arranged to allow a tag to be stably recognized (or to prevent a service-impossible area from existing) in a loop formed by the first coil 15 in consideration of strength of a magnetic field according to superposition and cancellation of a magnetic field.

According to an embodiment, in the case that a plurality of tags is placed around the electronic device 100 of FIG. 1, there would be generated a condition for recognizing all of the plurality of tags. Because a first coil (e.g., the first coil 13 of FIG. 2) and a second coil (e.g., the second coil 15 of FIG. 2), which are included in an electronic device, form coincidently magnetic fields through one-time current control, it may be difficult to recognize two devices at the same time through one-time current control. For example, in the case that a tag close to the first coil is placed and a tag close to a second coil are placed around an electronic device, if a current supplied to the coil antenna 10 of FIG. 2 is input to a first input terminal (e.g., the first input terminal 3 of FIG. 2), the tag close to the first coil may be first recognized and thereby the tag close to the second coil may be hardly recognized even though a magnetic field is generated by the second coil after the recognition of the tag close to the first coil. As another example, a current supplied to the coil antenna is input to a second input terminal (e.g., the second input terminal 5 of FIG. 2), the tag close to the second coil may be first recognized and thereby the tag close to the first coil may be hardly recognized even though a magnetic field is generated by the first coil after the recognition of the tag close to the second coil.

According to an embodiment, an antenna control module (e.g., the antenna control module 112 of FIG. 1) may control a current direction to allow a plurality of elements (e.g., tags), which are placed around an electronic device, to be all recognized under control of a processor (e.g., the processor 120 of FIG. 1). For example, an antenna control module may alternately supply a current to a first input terminal and a second input terminal. As described above, in the case of supplying a current the first input terminal, it may be permissible to recognize a tag close to the first coil. In the case of supplying a current to the second input terminal, it may permissible to recognize a tag close to the second coil.

Figure 7:
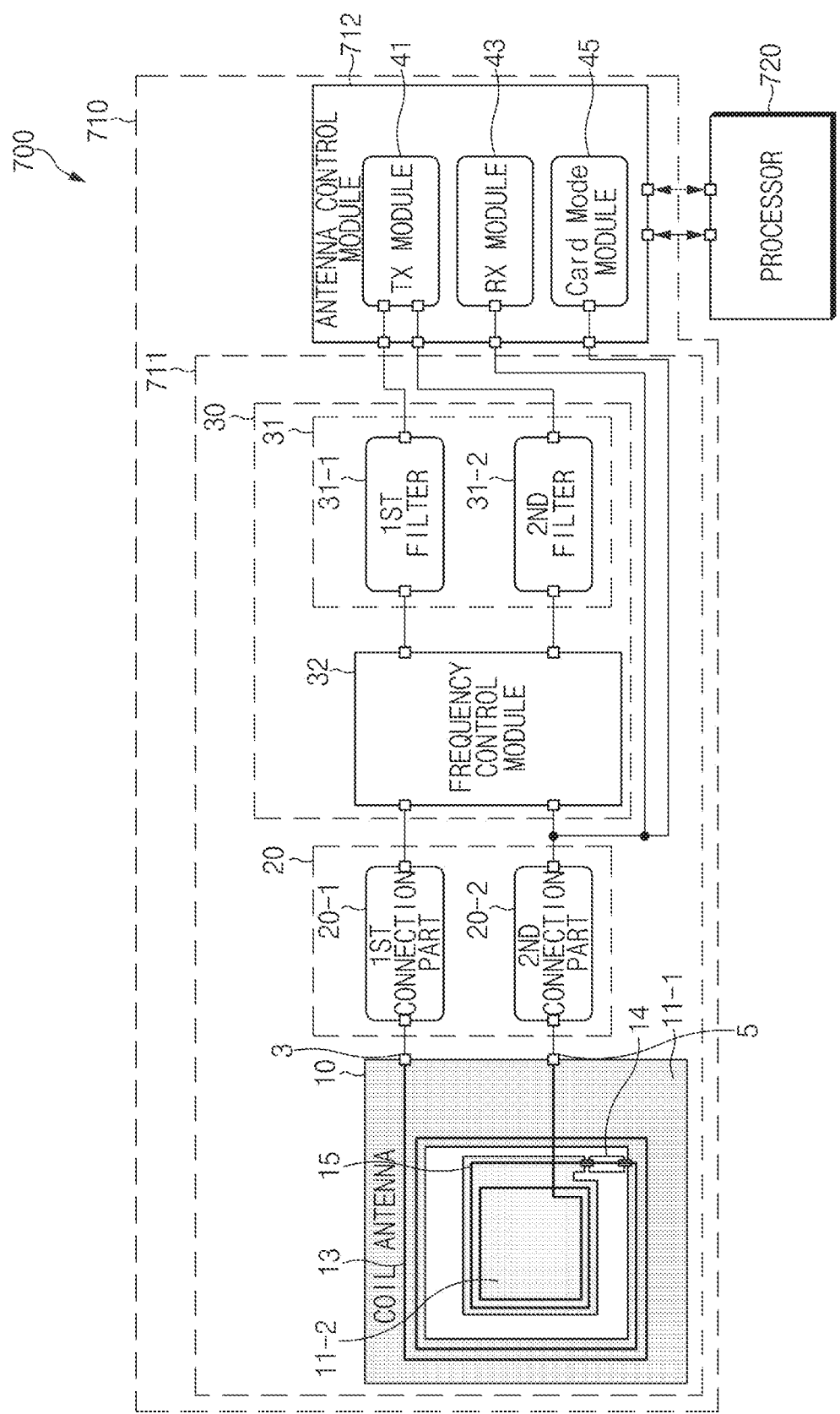
FIG. 7 is a block diagram illustrating a configuration of an electronic device according to various embodiments of the present disclosure.

FIG. 7 is a block diagram illustrating a configuration of an electronic device according to various embodiments of the present disclosure.

Referring to FIG. 7, an electronic device 700 (e.g., the electronic device 100 of FIG. 1) may include a communication module 710 (e.g., the communication module 110 of FIG. 1) and a processor 720 (e.g., the processor of FIG. 1).

According to an embodiment, the communication module 710 may include an antenna module 711 (e.g., the antenna module 111 of FIG. 1) and an antenna control module 712 (e.g., the antenna control module 112 of FIG. 1). According to an embodiment, the antenna module 711 may include a coil antenna 10, a connection part 20, and a signal processing module 30. The electronic device 700 shown in FIG. 7 is the same with the electronic device 200 of FIG. 1 but the structure of the coil antenna 10, so the difference between the electronic devices 200 and 700 will be described on the point of the structure of the coil antenna.

According to an embodiment, the coil antenna 10 of FIG. 7 (e.g., the coin antenna 10 of FIG. 2) may include a plurality of coils. The coil antenna 10 may include, for example, a first coil 13 and a second coil 15. According to an embodiment, the first coil 13 (e.g., the first coil 13 of FIG. 2) may be shaped in a loop which rotates with a specific number of rotation times in a specific direction. According to an embodiment, the second coil 15 (e.g., the second coil 15 of FIG. 2) may be shaped in a loop which is extended from the first coil 13 and rotates with a specific number of rotation times in a specific direction.

According to an embodiment, each end of the first coil 13 and the second coil 15 may be connected with an input terminal. For example, an end of the first coil 13 may be connected with a first input terminal 3 and an end of the second coil 15 may be connected with a second input terminal 5. The first coil 13 and the second coil 15 may I/O a signal respectively through the first input terminal 3 and the second input terminal 5.

According to an embodiment, the first coil 13 and the second coil 15 may be formed respectively on different printed circuit boards. For example, the first coil 13 may be formed in at least a partial area of a first printed circuit board 11-1 and the second coil 15 may be formed in at least a partial area of a second printed circuit board 11-2. According to an embodiment, the first coil 13 and the second coil 15 may be electrically connected each other through a coil connection part 14. This configuration will be detailed below in conjunction with FIG. 8 according to various embodiments of the present disclosure.

Figure 8:
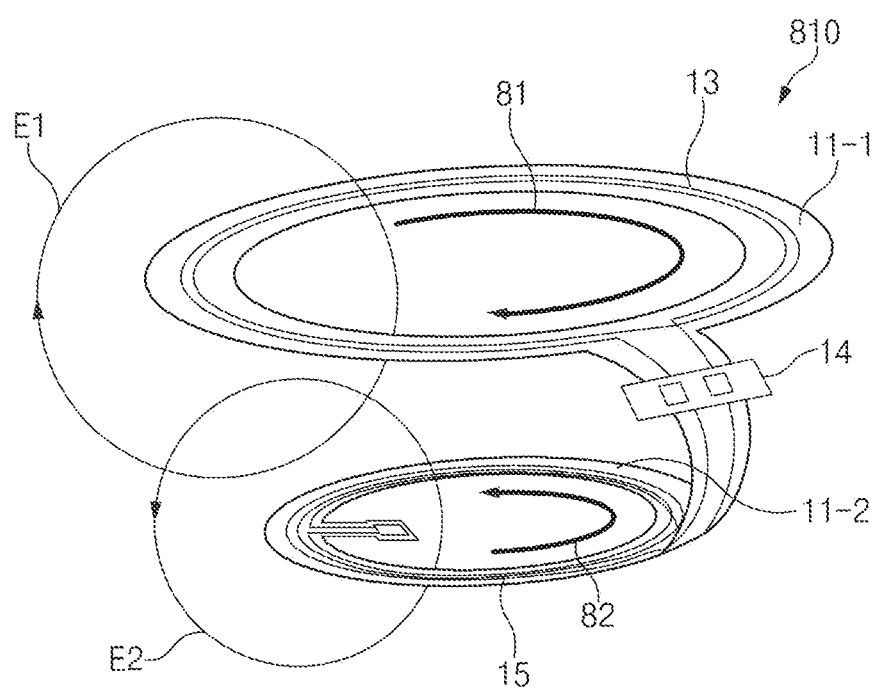
FIG. 8 illustrates a structure of a coil antenna according to various embodiments of the present disclosure.

FIG. 8 illustrates a structure of a coil antenna according to various embodiments of the present disclosure.

Referring to FIG. 8, a coil antenna 810 (e.g., the coil antenna 10 of FIG. 7) may include a first coil 13 (e.g., the first coil 13 of FIG. 7) and a second coil 15 (e.g., the second coil 15 of FIG. 7). According to an embodiment, the first coil 13 and the second coil 15 may be formed respectively on different surfaces. According to an embodiment, the first coil 13 and the second coil 15 may be arranged to face each other on different surfaces. According to an embodiment, the first coil 13 and the second coil 15 may be arranged to be spaced apart from each other by a specific distance. For example, a surface which is formed by the first coil 13 may face a surface, which is formed by the second coil 15, in a distance equal to or larger than a specific distance. For example, the first coil 13 and the second coil 15 may be arranged in three-dimensional form.

According to an embodiment, the first coil 13 and the second coil 15 may be formed in at least a partial area of an additional printed circuit board (e.g., FPCB). For example, the first coil 13 may be formed in at least a partial area of a first printed circuit board 11-1 and the second coil 15 may be formed in at least a partial area of a second printed circuit board 11-2. According to an embodiment, the first coil 13 and the second coil 15 may be electrically connected each other through a coil connection part 14. The coil connection part 14 may be placed between the first printed circuit board 11-1 and the second printed circuit board 11-2 and may electrically connect the first coil 13 and the second coil each other on different printed circuit boards.

According to an embodiment, the first coil 13 and the second coil 15 may be different in a rotation direction. For example, the first coil 13 and the second coil 15 may be arranged to be contrary each other in directions of currents flowing along them. For example, referring to FIG. 8, if a current flowing along the first coil 13 circles in the clockwise direction 81, a current flowing along the second coil 15 may circle in the anticlockwise direction 82. As another example, if a current flowing along the first coil 13 circles anticlockwise, a current flowing along the second coil 15 may circle clockwise. According to an embodiment, if a current flows along the first coil 13, a magnetic field E1 may be formed around the first coil 13. According to an embodiment, if a current flows along the second coil 15, a magnetic field E2 may be formed around the second coil 15. According to an embodiment, in the case that the first coil 13 and the second coil 15 are different in a rotation direction, magnetic fields formed between the first coil 13 and the second coil 15 may be interactively cancelled each other. In the case that the first coil 13 and the second coil 15 are different in a rotation direction, magnetic fields proceeding outward the first coil 13 and the second coil 15 may be superposed to improve antenna performance sideward the first coil 13 and the second coil 15.

Figure 9:
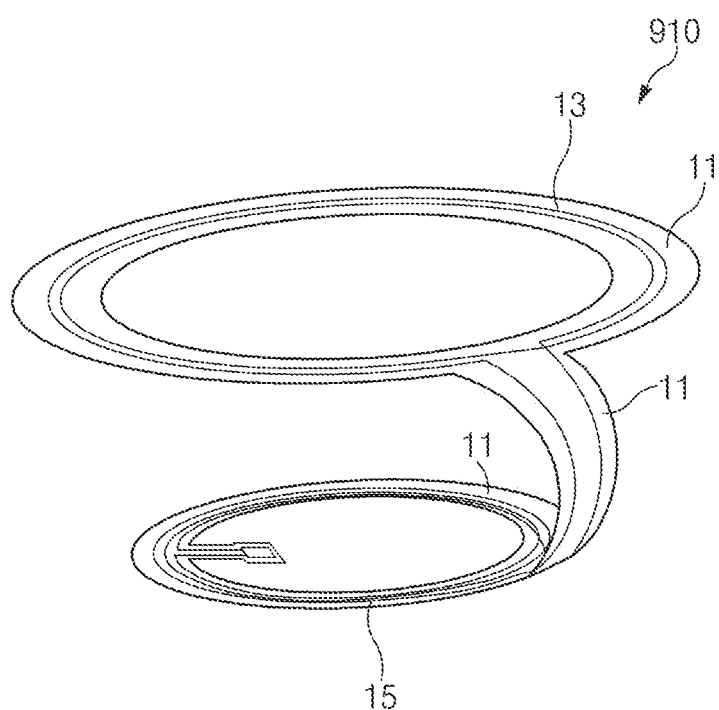
FIG. 9 illustrates a structure of a coil antenna according to various embodiments of the present disclosure.

FIG. 9 illustrates a structure of a coil antenna according to various embodiments of the present disclosure.

Referring to FIG. 9, a coil antenna 910 (e.g., the coil antenna 10 of FIG. 2) may include a first coil 13 (e.g., the first coil 13 of FIG. 2) and a second coil 15 (e.g., the second coil 15 of FIG. 2). According to an embodiment, the first coil 13 and the second coil 15 may be formed on different surfaces. According to an embodiment, the first coil 13 and the second coil 15 may be arranged to face each other on different planes. According to an embodiment, the first coil 13 and the second coil 15 may be arranged in a distance equal to or larger than a specific distance. For example, a surface formed by the first coil 13 may face a surface formed by the second coil 15 while spaced apart from each other by a distance equal to or larger than a specific distance. That is, the first coil 13 and the second coil 15 may be arranged in a three-dimensional form.

According to an embodiment, the first coil 13 and the second coil 15 may be arranged to face each other on different surfaces in at least a partial area of a printed circuit board 11 (e.g., the printed circuit board 11 of FIG. 2). For example, as shown in FIG. 9, the first coil 13 and the second coil 15 may be arranged to face each other on a FPCB which is flexible. According to an embodiment, in the case that the first coil 13 and the second coil 15 are formed on a single printed circuit board, a coil connection part (e.g., the coil connection part 14 of FIG. 5) may be excluded therefrom.

Referring to FIGS. 2 to 9 according to various embodiments of the present disclosure, the first coil (e.g., the first coil 13 of FIG. 2) and the second coil (e.g., the second coil 15 of FIG. 2) may be electrically connected each other in the coil antenna (e.g., the coil antenna 10 of FIG. 2). An end of the first coil 13 may be connected with an antenna control module (e.g., the antenna control module 212 of FIG. 2) through a first input terminal (e.g., the first input terminal 3 of FIG. 2). An end of the second coil 15 may be connected with the antenna control module through a second input terminal (e.g., the second input terminal 5 of FIG. 2).

According to various embodiments of the present disclosure, the first coil and the second coil may be electrically isolated each other. For example, opposite ends of the first coil may be electrically connected with the first input terminal and the second input terminal, opposite ends of the second coil may be electrically connected with the third input terminal and the fourth input terminal, and the first to fourth input terminals may be electrically connected with the antenna control module. According to an embodiment, the antenna control module may supply a current to the first coil through the first input terminal or the second input terminal. According to an embodiment, the antenna control module may supply a current to the second coil through the third input terminal or the fourth input terminal. According to an embodiment, the antenna control module may supply a current, coincidently or sequentially, to the first coil and the second coil. For example, the antenna control module may coincidently supply a current to the first input terminal (or the second input terminal) and the third input terminal (or the fourth input terminal). As another example, the antenna control module may supply a current to the first coil through one of the first input terminal and the second input terminal. If a current is received from the first coil through the other of the first input terminal and the second input terminal, the antenna control module may supply a current to the second coil through one of the third input terminal and the fourth input terminal and may receive a current through the other of the third input terminal and the fourth input terminal. According to an embodiment, the antenna control module may supply a current to equalize directions of currents glowing along the first coil and the second coil, or to reverse directions of current each other.

Figure 10A:
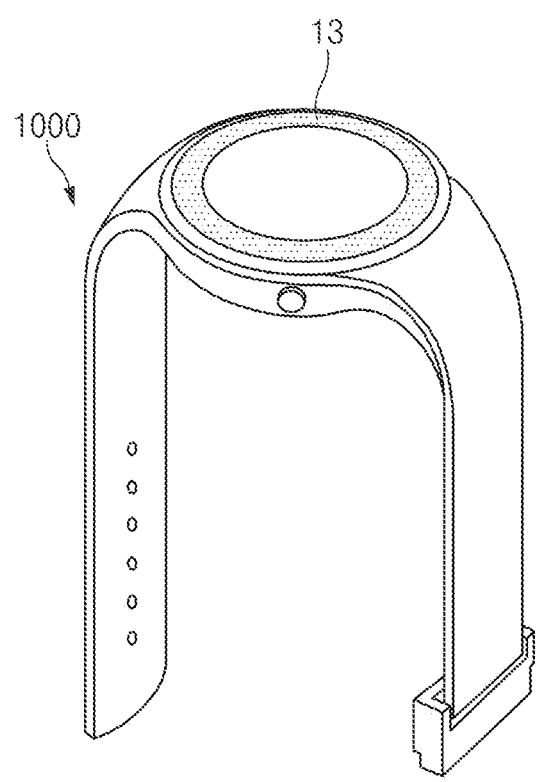
FIGS. 10A and 10B illustrate an electronic device including a coil antenna according to various embodiments of the present disclosure.
Figure 10B:
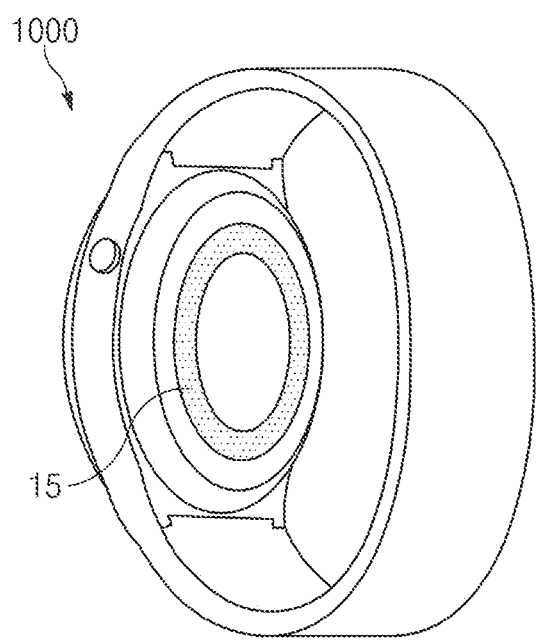

FIGS. 10A and 10B illustrate an electronic device including a coil antenna according to various embodiments of the present disclosure.

Referring to FIGS. 10A and 10B, an electronic device 1000 (e.g., the electronic device 100 of FIG. 1) may be a wearable device (e.g., smart watch).

Referring to FIG. 10A according to various embodiments, a first coil 13 may be arranged at the front surface (e.g., display surface) of the electronic device 1000. According to an embodiment, the first coil 13 (e.g., the first coil 13 of FIG. 7) may transmit or receive a signal with a device (e.g., NFC tag or NFC reader) which is placed upward the electronic device 1000.

Referring to FIG. 10B according to various embodiments, a second coil 15 (e.g., the second coil 15 of FIG. 7) may be arranged on the rear surface of the electronic device 1000. According to an embodiment, the second coil 15 may transmit or receive a signal with a device (e.g., NFC tag) which is placed downward the electronic device 1000.

According to an embodiment, a coil (e.g., the first coil) arranged at the front surface of the electronic device 1000 may be designed in optimization to a first mode (e.g., NFC card mode), and a coil (e.g., the second coil 15) arranged at the rear surface of the electronic device 1000 may be designed in optimization to a second mode (e.g., NFC reader mode).

Figure 11:
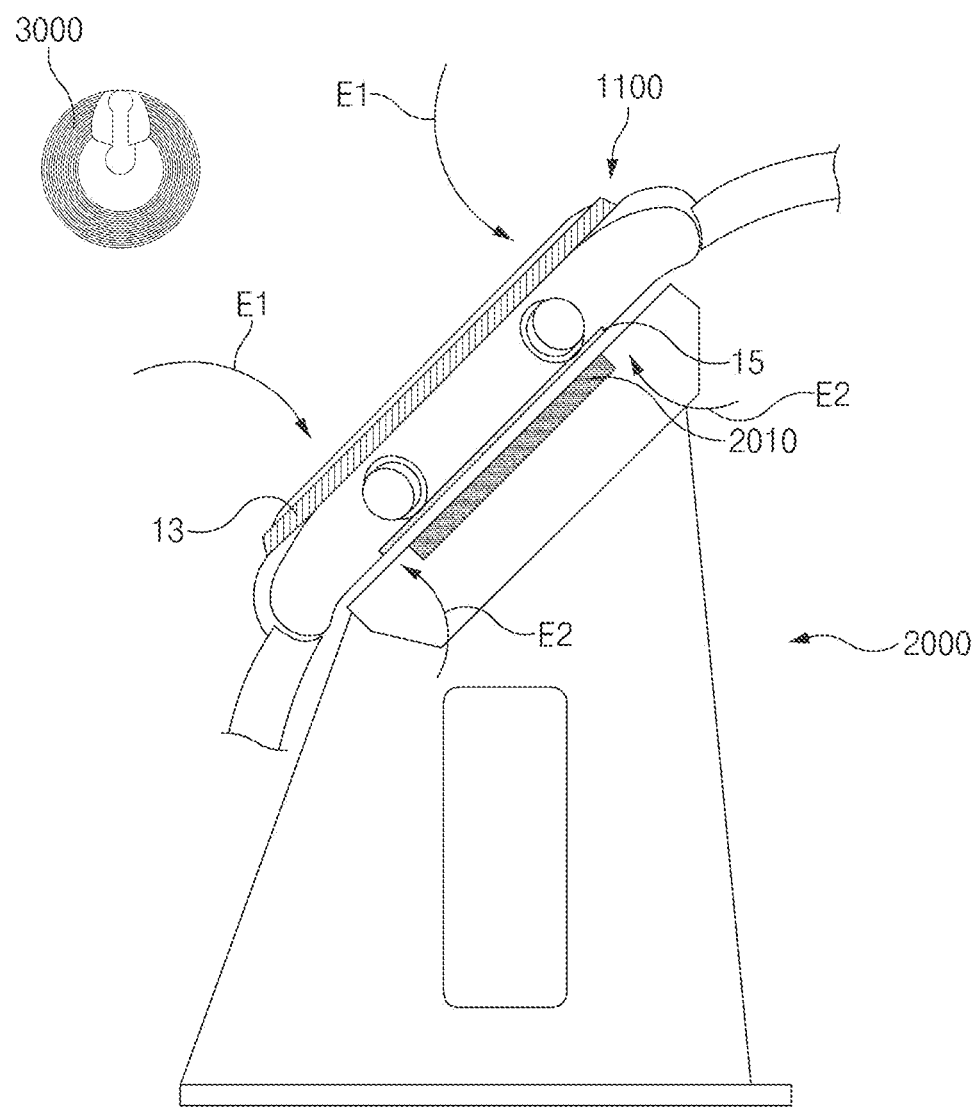
FIG. 11 illustrates a user environment of an electronic device according to various embodiments of the present disclosure.

FIG. 11 illustrates a user environment of an electronic device according to various embodiments of the present disclosure.

Referring to FIG. 11 according to various embodiments, an electronic device 1100 (e.g., the electronic device 100 of FIG. 1) may be a wearable device (e.g., smart watch). In the state that the electronic device is worn on a user's wrist, the electronic device 1100 may be allowed to transmit or receive a signal with a device locating at the front of the electronic device 1100, but may not be allowed to transmit or receive a signal with a device locating at the back thereof. In the state that the electronic device 1100 is not worn on a user's wrist, there would be a need of coincidently transmitting or receiving signals with devices locating at the front and the back of the electronic device 1100. For example, the electronic device 1100 may transmit or receive a signal with a first tag 2010 (e.g., NFC tag) which is included in a mount 2000 locating at the back, and may be also transmit or receive a signal with a second tag 3000 (e.g., NFC tag) locating at the front.

Since a first coil 13 (e.g., the first coil 13 of FIG. 7) and a second coil 15 (e.g., the second coil 15 of FIG. 7), which are included in the electronic device 1100, form a magnetic field by one-time current control, it may be difficult to coincidently recognize two devices by one-time current control. For example, if a current supplied to the coin antenna 10 of FIG. 7 is input to the first input terminal 3 of FIG. 7, the second tag 3000 may be first recognized by a magnetic field E1 which is generated by the first coil 13. Accordingly, the first tag 2010 included in the mount 2000 may be hardly recognized even though a magnetic field E2 is generated by the second coil 15. As another example, if a current supplied to the coin antenna 10 of FIG. 7 is input to the second input terminal 3 of FIG. 7, the first tag 2010 may be first recognized by the magnetic field E2 which is generated by the second coil 15. Accordingly, the second tag 3000 may be hardly recognized even though a magnetic field E1 is generated by the first coil 13.

According to an embodiment, an antenna control module (e.g., the antenna control module 712 of FIG. 7) included in the electronic device 1100 may control a direction of current to recognize a plurality of devices (e.g., tags) locating at the front and the back of the electronic device 1100. For example, the antenna control module may alternately supply a current to an input terminal (e.g., the first input terminal 3 of FIG. 7) which is connected with the first coil 13, and an input terminal (e.g., the second input terminal 4 of FIG. 7) which is connected with the second coil 15. According to an embodiment, in the case of supplying a current to the first input terminal, the second tag 3000 may be recognized thereby. The first tag 2010 may be recognized in the case of supplying a current to the second input terminal. Accordingly, the electronic device 1100 may recognize all of a plurality of tags locating around the electronic device 1100.

Figure 12:
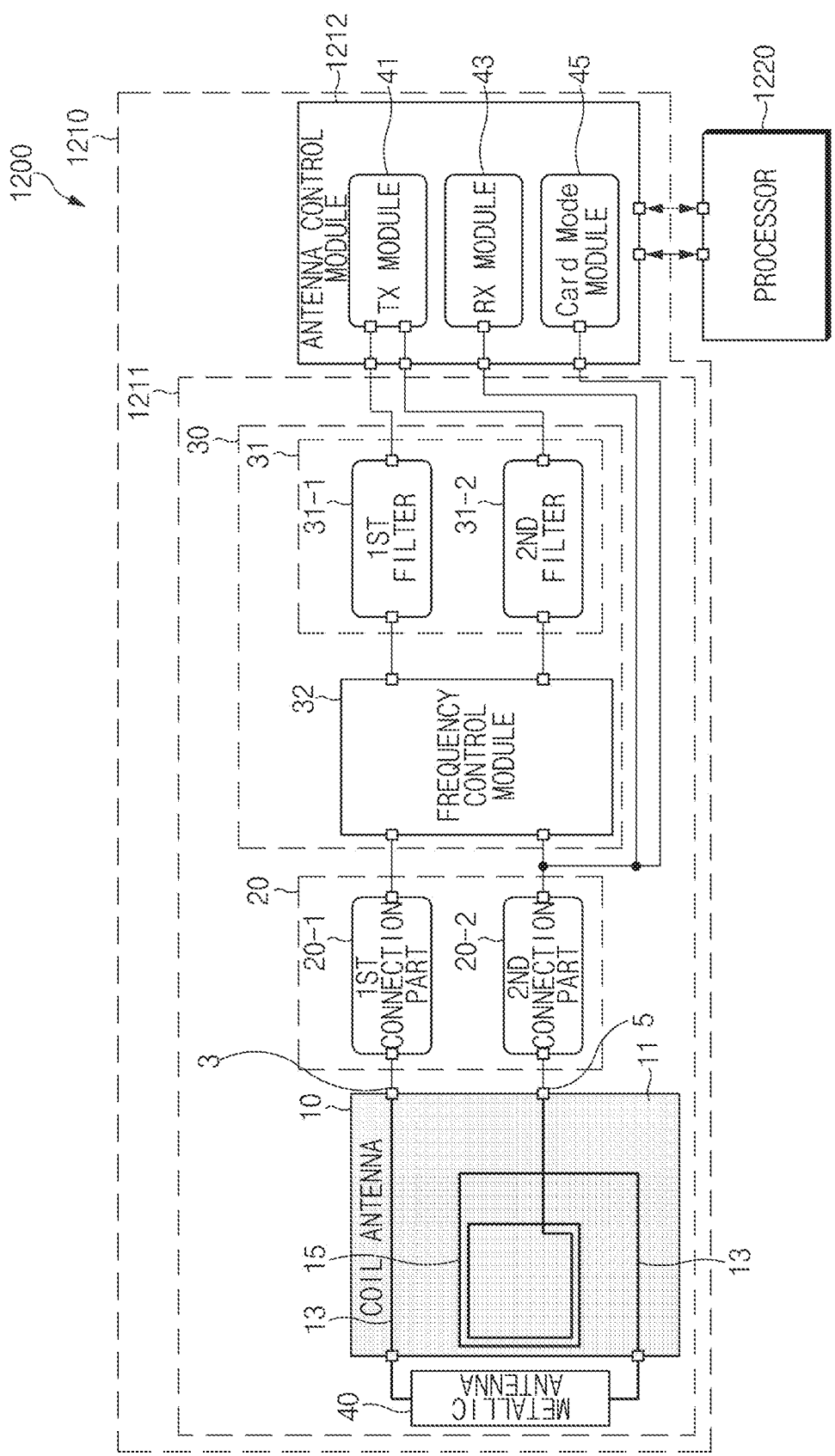
FIG. 12 is a block diagram illustrating a configuration of an electronic device according to various embodiments of the present disclosure.

FIG. 12 is a block diagram illustrating a configuration of an electronic device according to various embodiments of the present disclosure.

Referring to FIG. 12, the electronic device 1200 (e.g., the electronic device 100 of FIG. 1) may include a communication module 1210 (e.g., the communication module 110 of FIG. 1) and a processor 1220 (e.g., the processor of FIG. 1).

According to an embodiment, the communication module 1210 may include an antenna module 1211 (e.g., the antenna module 111 of FIG. 1) and an antenna control module 1212 (e.g., the antenna control module 112 of FIG. 1). According to an embodiment, the antenna module 1211 may include a coil antenna 10 (e.g., the coil antenna 10 of FIG. 2), a connection part 20 (e.g., the connection part of FIG. 2), a signal processing module 30 (e.g., the signal processing module 30 of FIG. 2), and a metallic antenna 40. The communication module 1210 shown in FIG. 12 is the same with the communication module 210 of FIG. 2 but the coil antenna 10 and the metallic antenna 40, so the difference between them will be described below.

According to an embodiment, the metallic antenna 40 may be a metal plate antenna. According to an embodiment, the metallic antenna 40 may be a multiband antenna which allows various frequency band communications such as long term evolution (LTE), Wi-Fi, Bluetooth (BT), or global navigation satellite system (GNSS). According to an embodiment, the metallic antenna 40 may be placed in the electronic device 1200 or on a surface of the electronic device 1200.

According to an embodiment, the metallic antenna 20 may be electrically connected with the coil antenna 10. For example, the metallic antenna 40 may be electrically connected with a first coil 13 which is placed out of the coil antenna 10. An interconnection structure of the coil antenna 10 and the metallic antenna 40 will be described later in conjunction with FIG. 14.

Figure 13:
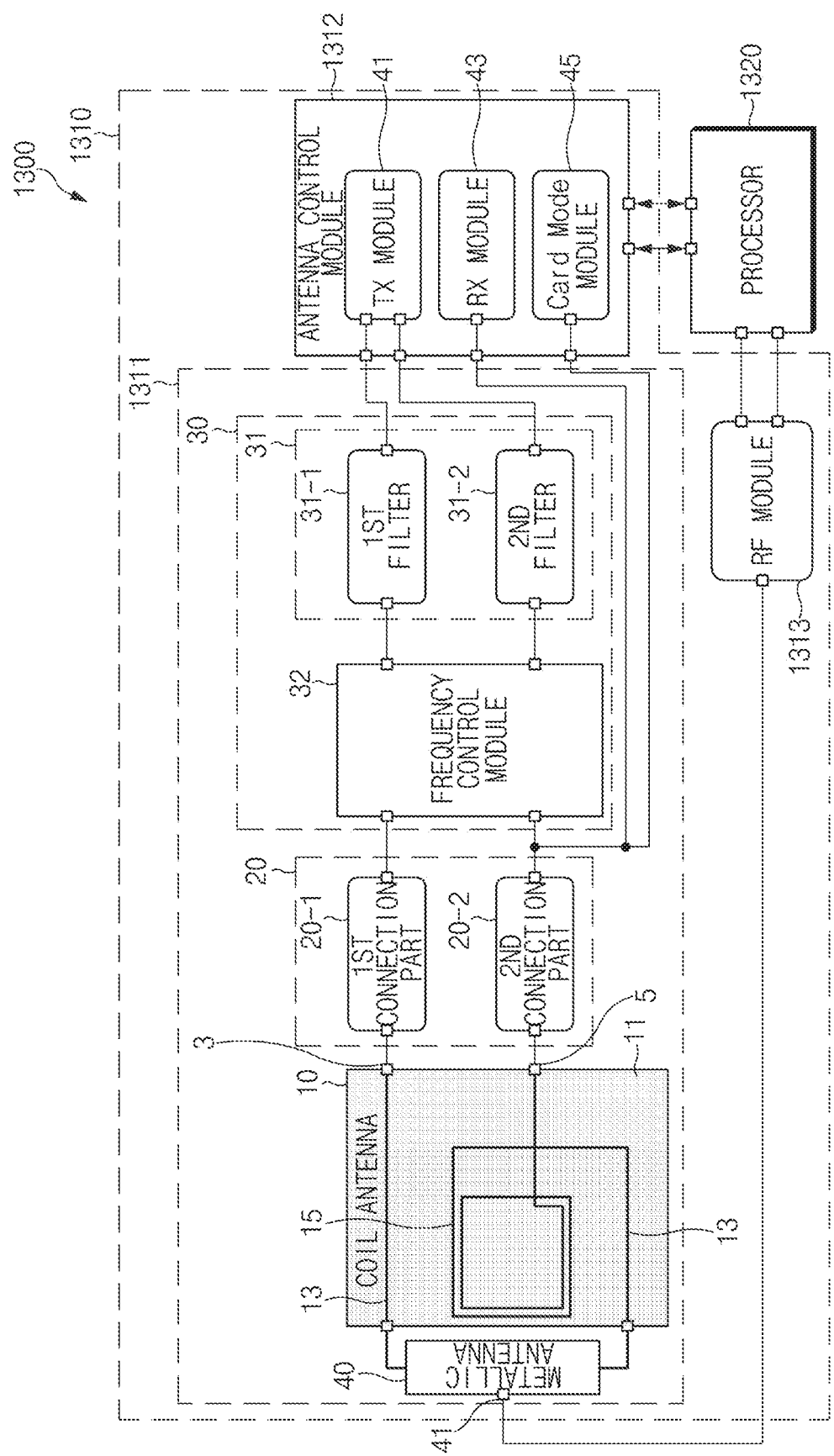
FIG. 13 is a block diagram illustrating a configuration of an electronic device according to various embodiments of the present disclosure.

FIG. 13 is a block diagram illustrating a configuration of an electronic device according to various embodiments of the present disclosure.

Referring to FIG. 13, an electronic device 1300 (e.g., the electronic device 100 of FIG. 1) may include a communication module 1310 (e.g., the communication module 110 of FIG. 1) and a processor 1320 (e.g., the processor 120 of FIG. 1).

According to an embodiment, the communication module 1310 may include an antenna module 1311 (e.g., the antenna module 111 of FIG. 1), an antenna control module 1312 (e.g., the antenna control module 112 of FIG. 1), and a radio frequency (RF) module 1313. According to an embodiment, the antenna module 1311 may include a coil antenna 10 (e.g., the coil antenna 10 of FIG. 12), a connection part 20

(e.g., the connection part 20 of FIG. 12), a signal processing module (e.g., the signal processing module 30 of FIG. 12), and a metallic antenna 40 (e.g., the metallic antenna 40 of FIG. 12). The communication module 1310 shown in FIG. 13 is the same with the communication module 1210 of FIG. 12 but the RF module 1313, so the difference will be described below.

According to an embodiment, the RF module 1313 may include a processor for processing data which is transmitted or received through the metallic antenna 40. According to an embodiment, the RF module 1313 may supply a signal, which is to be transmitted to an external device, to the metallic antenna 40, and may analyze a signal which is received from an external device into the metallic antenna 40. According to an embodiment, the RF module 1313 may be a module for performing communication with LTE, Wi-Fi, BT, or GNSS. According to an embodiment, the RF module 1313 may be implemented in a chip (e.g., IC chip) which is designed to perform communication with LTE, Wi-Fi, BT, or GNSS. According to an embodiment, the RF module 1313 may transmit or receive a signal with the metallic antenna 40 through an additional input terminal (e.g., an RF input terminal 41).

According to an embodiment, the metallic antenna 40 may operate as an antenna for the antenna control module 1312 if a current is supplied to a first input terminal (e.g., the first input terminal 3 of FIG. 12) or a second input terminal (e.g., the second input terminal 5 of FIG. 12) by the antenna control module 1312. The metallic antenna 40 may operate as an antenna for the RF module 1313 if a current is supplied to the RF input terminal 41 by the RF module 1313.

Figure 14:
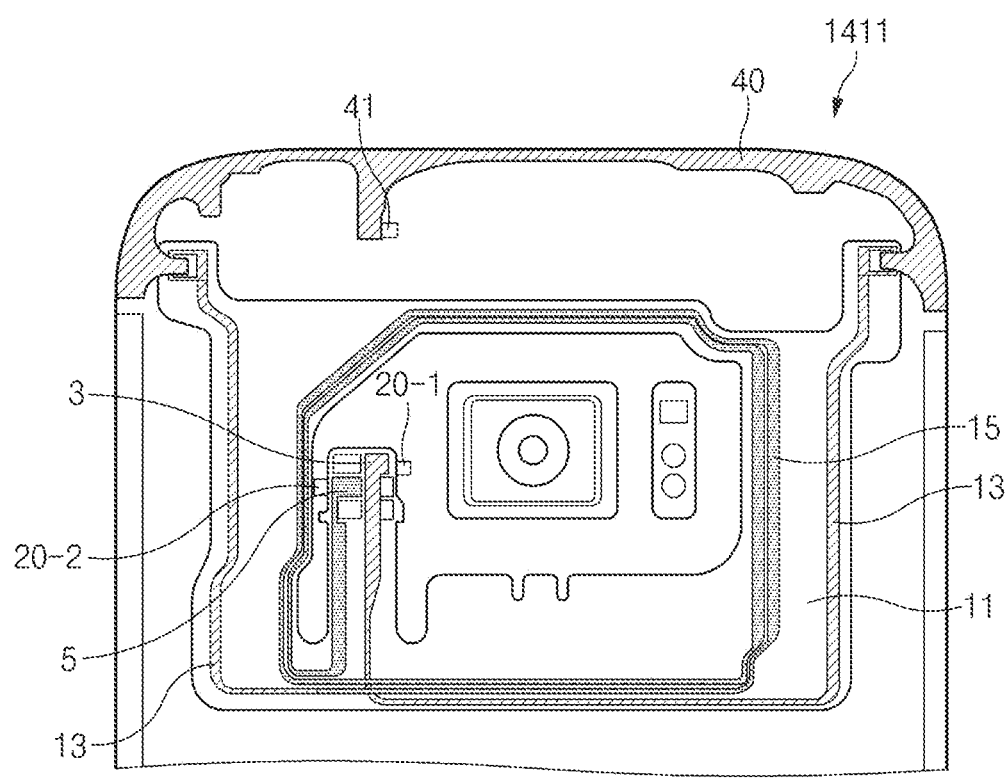
FIG. 14 illustrates a structure of an antenna module according to various embodiments of the present disclosure.

FIG. 14 illustrates a structure of an antenna module according to various embodiments of the present disclosure.

Referring to FIG. 14, the antenna module 1411 (e.g., the antenna module 1211 of FIG. 12) may include a first coil 13 (e.g., the first coil 13 of FIG. 12), a second coil 15 (e.g., the second coil 15 of FIG. 12), and a metallic antenna 40 (e.g., the metallic antenna 40 of FIG. 12). According to an embodiment, opposite ends of the metallic antenna 40 may be electrically connected with the coil 13. According to an embodiment, the coil 13 may be divided by the metallic antenna 40. For example, the first coil 13 divided into two parts may be electrically connected with the metallic antenna 40. Opposite ends of the metallic antenna 40 may be connected respectively with the two divided parts of the first coil 13. The metallic antenna 40 may form a loop together with the first coil 13. For example, a current supplied from a first input terminal 3 (e.g., the first input terminal 3 of FIG. 12) or a second input terminal (e.g., the second input terminal 5 of FIG. 12) may reflow along the first coil 13 through the metallic antenna 40.

According to an embodiment, the first coil 13 and the metallic antenna 40 may be connected through a soldering or supersonic welding method, or a connection member (e.g., C-clip). According to an embodiment, a connection part between the first coil 13 and the metallic antenna 40 may be utilized as an input terminal.

According to an embodiment, the metallic antenna 40 may be arranged in a distance equal to or larger than a specific distance from the second coil 15 for the purpose of extending a range of recognizing a tag (e.g., NFC tag). According to an embodiment, by utilizing the metallic antenna 40 connected with the first coil 13, it may be permissible to extend a tag recognition range. For example, referring to FIG. 14, the metallic antenna 40 arranged at the upper side of the antenna module 1411 may recognize a tag which is placed at the upper side of an electronic device (e.g., the electronic device 100 of FIG. 1).

Figure 15:
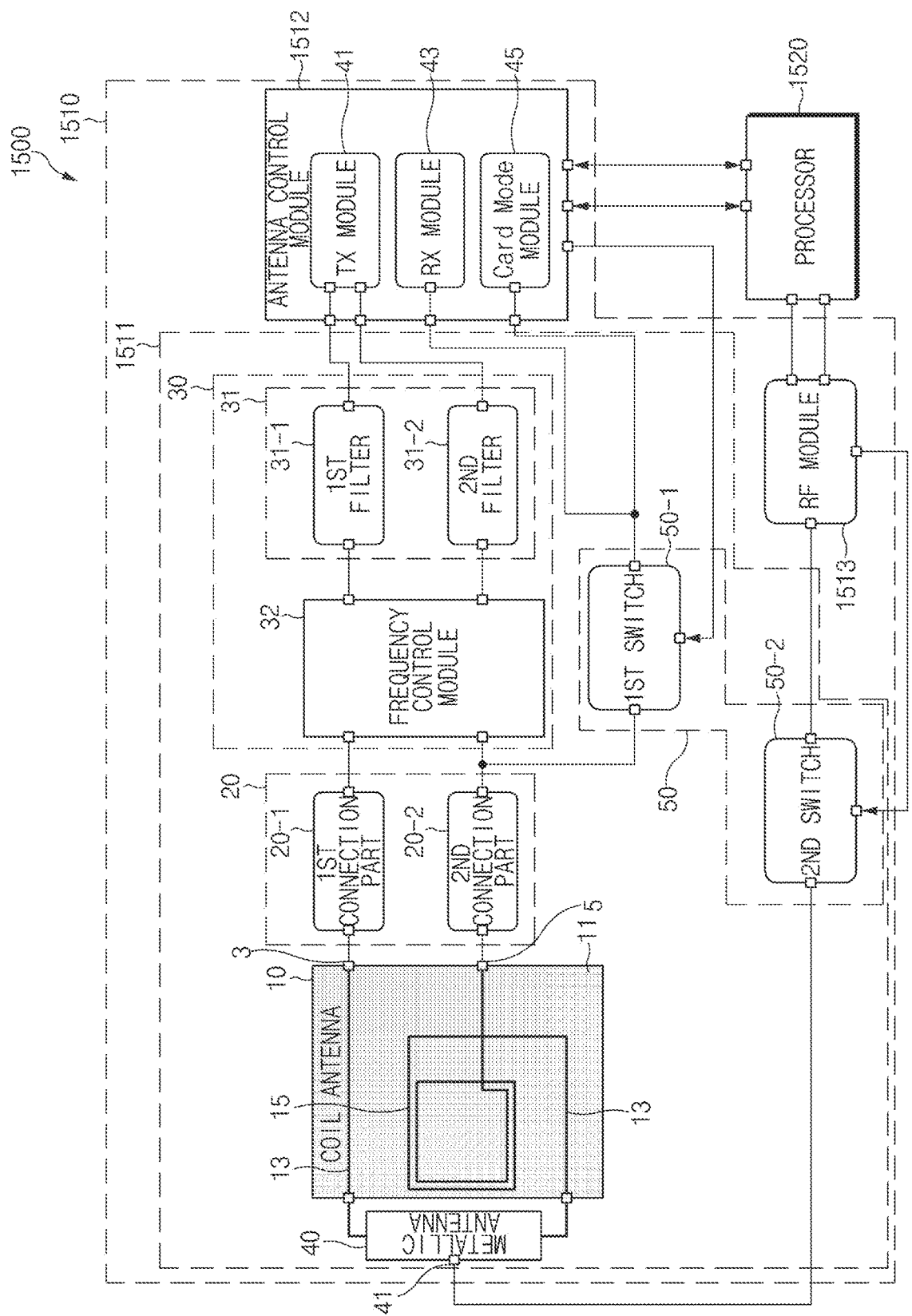
FIG. 15 is a block diagram illustrating a configuration of an electronic device according to various embodiments of the present disclosure.

FIG. 15 is a block diagram illustrating a configuration of an electronic device according to various embodiments of the present disclosure.

Referring to FIG. 15, an electronic device 1500 (e.g., the electronic device 100 of FIG. 1) may include a communication module 1510 (e.g., the communication module 110 of FIG. 1) and a processor 1520 (e.g., the processor 120 of FIG. 1).

According to an embodiment, the communication module 1510 may include an antenna module 1511 (e.g., the antenna module 111 of FIG. 1), an antenna control module 1512 (e.g., the antenna control module 112 of FIG. 1), and an RF module 1513 (e.g., the RF module 1313 of FIG. 13). According to an embodiment, the antenna module 1511 may include a coil antenna 10, a connection part 20, a signal processing module 30, a metallic antenna 40, and a switch module 50. The communication module 1510 shown in FIG. 15 is the same with the communication module 1310 but the switch module 50, so the difference will be described below.

According to the description in conjunction with FIG. 13, the metallic antenna 40 may be electrically connected with the antenna control module 1512 and the RF module 1513. Accordingly, the antenna control module 1512 and the RF module 1513 may be damaged due to signals which are inadvertently different in frequency. To prevent such damage, the antenna module 1511 may include the switch module 50.

The switch module 50 according to various embodiments may include at least one switch (e.g., a first switch 50-1 and a second switch 50-2). According to an embodiment, the first switch 50-1 may connect the coil antenna 10 with the antenna control module 1512. For example, the switch 50-1 may be placed on a signal line, which connects a second connection part 20-2 with an RX module 43, and on a signal line which connects the second connection part 20-2 with a card mode module 45. According to an embodiment, the first switch 50-1 may control (or switch) a signal which is transmitted to the antenna control module 1512 from the coil antenna 10. For example, if the first switch 50-1 is turned off, signal transmission may be interrupted between the coil antenna 10 and the antenna control module 1512.

The second switch 50-2 according various embodiments may connect the metallic antenna 40 with the RF module 1513. For example, the second switch 50-2 may be arranged on a signal line which connects the metallic antenna 40 with the RF module 1513. According to an embodiment, the second switch 50-2 may control (or switch) a signal which is transmitted or received between the metallic antenna 40 and the RF module 1513. For example, if the second switch 50-2 is turned off, signal transmission or reception may be interrupted between the metallic antenna 40 and the RF module 1513.

According to an embodiment, the antenna control module 1512 may control the first switch 50-1 to be turned on or off under control of the processor 1520. According to an embodiment, the RF module 1513 may control the second switch 50-2 to be turned on or off under control of the processor 1520.

According to an embodiment, the processor 1520 may control the RF module 1513 to turn off the second switch 50-2 if a signal is output from a TX module 41. Accordingly, it may be permissible to prevent a signal, which is output from the antenna control module 1512, from being conveyed to the RF module 1513. As another example, the processor 1520 may control the RF module 1513 to turn off the first switch 50-1 if a signal is output from the TX module 41. Accordingly, it may be permissible to prevent a signal, which is output from the RF module 1513, from being conveyed to the antenna control module 1512.

Figure 16:
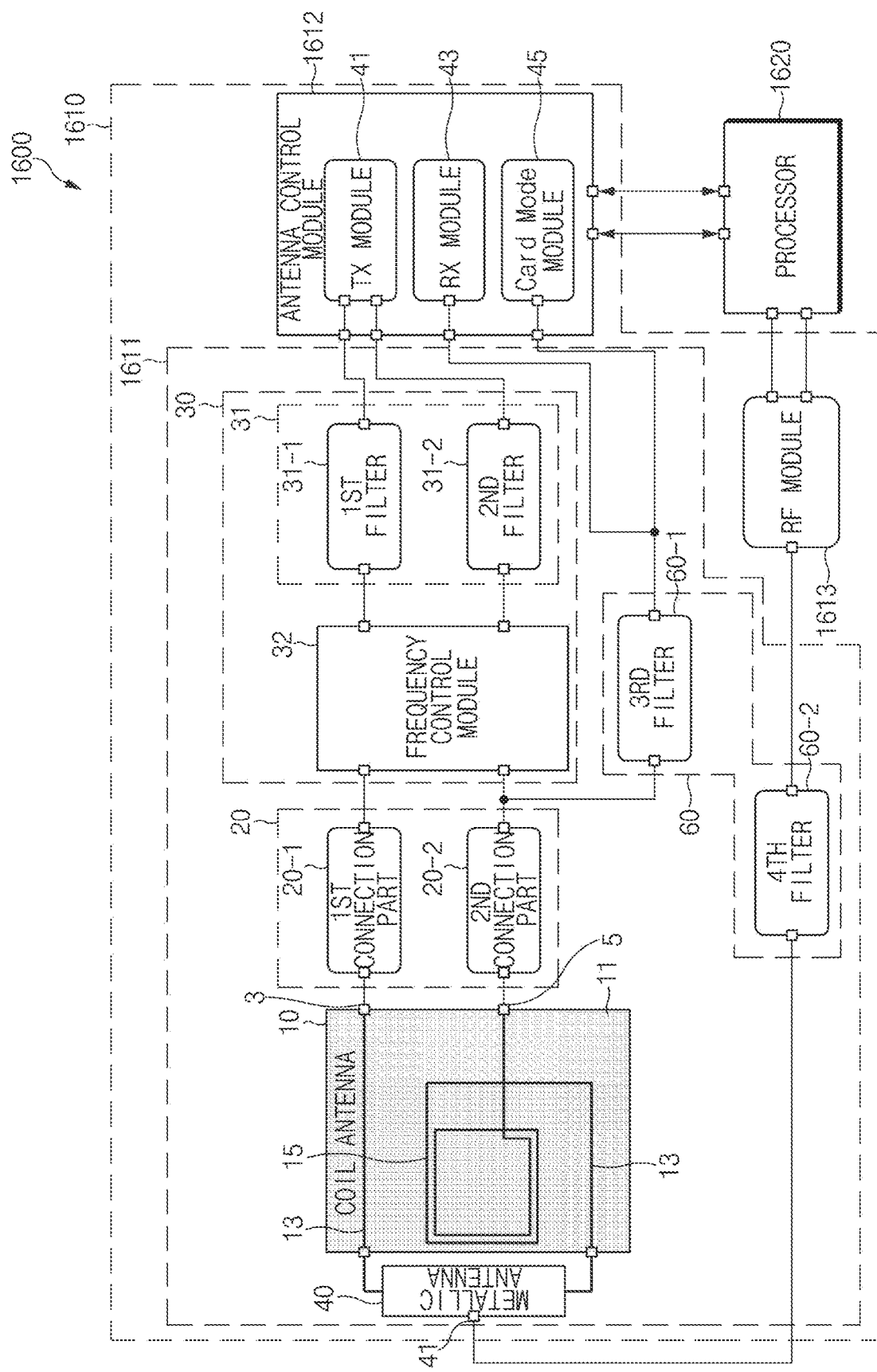
FIG. 16 is a block diagram illustrating a configuration of an electronic device according to various embodiments of the present disclosure.

FIG. 16 is a block diagram illustrating a configuration of an electronic device according to various embodiments of the present disclosure.

Referring to FIG. 16, an electronic device 1600 (e.g., the electronic device 100 of FIG. 1) may include a communication module 1610 (e.g., the communication module 110 of FIG. 1) and a processor 1620 (e.g., the processor 120 of FIG. 1).

According to an embodiment, the communication module 1610 may include an antenna module 1611 (e.g., the antenna module 111 of FIG. 1), an antenna control module 1612 (e.g., the antenna control module 1612 of FIG. 1), and an RF module 1613 (e.g., the RF module 1313 of FIG. 13). According to an embodiment, the antenna module 1613 may include a coil antenna 10, a connection part 20, a signal processing module 30, a metallic antenna 40, and a second filter module 60. The communication module 1610 shown in FIG. 16 is the same with the communication module 1310 but the second filter module 60, so the difference will be described below.

As described in conjunction with FIG. 13, the metallic antenna 40 may be electrically connected with the antenna control module 1612 and the RF module 1613. Accordingly, circuital damage would be caused because signals with inadvertently different frequencies are conveyed into the antenna control module 1612 and the RF module 1613. To prevent such circuital damage, the antenna module 161 may include the second filter module 60.

The second filter module 60 according to various embodiments may include a plurality of filters (e.g., a third filter 60-1 and a fourth filter 60-2). According to an embodiment, the third filter 60-1 may be placed on a signal line, which connects a second connection part 20-2 with an RX module 43, and on a signal line which connects the second connection part 20-2 with a card mode module 45. The third filter 60-1 may filter a signal which is transmitted to the control module 112 from the coil antenna 10. For example, the third filter 60-1 may filter a signal, which is transmitted to the antenna control module 1612 from the coil antenna 10, to convey only a frequency band signal which can be coverable by the antenna control module 1612. According to an embodiment, the third filter 60-1 may include various types of filters such as low pass filter, band pass filter, or band reflection filter.

According to an embodiment, the fourth filter 60-2 may be placed on a signal line which connects the metallic antenna 40 with the RF module 1613. The fourth filter 60-2 may filter a signal which is transmitted or received between the metallic antenna 40 and the RF module 1613. For example, the fourth filter 60-2 may filter a signal, which is transmitted to the RF module 1613 from the metallic antenna 40, to convey a frequency band signal which is coverable by the RF module 1613. According to an embodiment, the fourth filter 60-2 may include a filter such as duplexer, diplexer, or surface acoustic wave (SAW) filter, as well as low pass filter, band pass filter, or band reflection filter.

Although an communication module (e.g., the communication module 110 of FIG. 1) employed in the present disclosure is illustrated and described as including an antenna module (e.g., the antenna module 111 of FIG. 1) and an antenna control module (e.g., the antenna control module 112), the communication module (or communication circuit) may be even referred to as, for example, simply a partial element (e.g., an antenna control module, e.g., NFC circuit).

Figure 17:
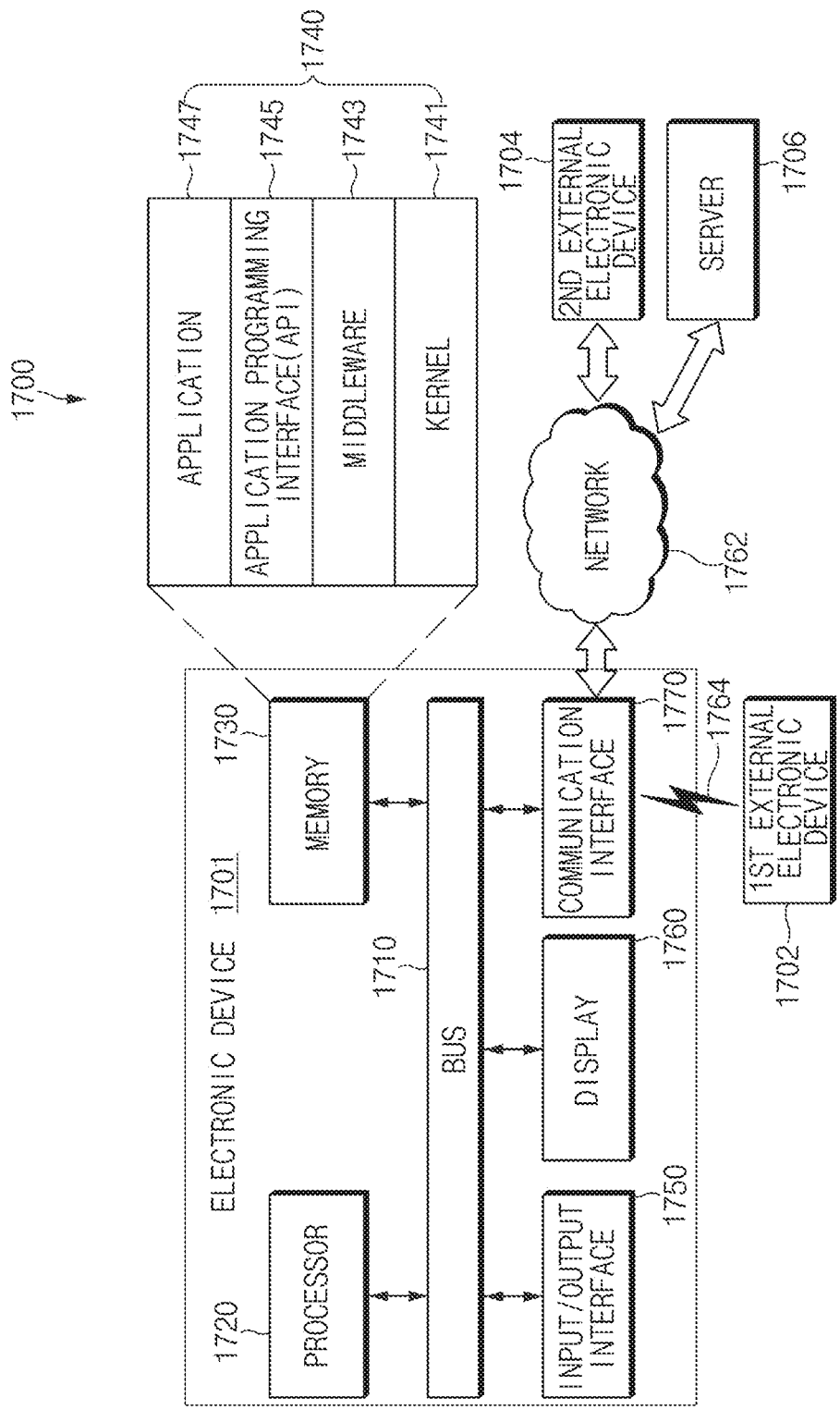
FIG. 17 illustrates an electronic device in a network environment according to various embodiments of the present disclosure.

FIG. 17 illustrates an electronic device in a network environment according to various embodiments of the present disclosure.

Referring to FIG. 17, an electronic device 1701 in a network environment 1700 will be described according to various embodiments. The electronic device 1701 may include a part or all elements of the electronic device shown in FIG.1. The electronic device 1701 may include a bus 1710, a processor 1720, a memory 1730, an I/O interface 1750, a display 1760, and a communication interface 1770. In some embodiments, the electronic device 1701 may exclude at least one of the elements therefrom or further include another element therein.

The bus 1710, for example, may include a circuit for connecting the elements 1710~1770 each other and relaying communication (control messages and/or data) between the elements.

The processor 1720 may include at least one or more of a CPU, an AP, or a communication processor (CP). The processor 1720, for example, may execute computation or data operation for control and/or communication of other elements of at least one of the electronic device 801.

The memory 1730 may include a volatile and/or nonvolatile memory. The memory 1730 may store, for example, instructions or data which are involved in at least one of other elements in the electronic device 1701. According to an embodiment, the memory 1730 may store software and/or a program 1740 therein.

The program 1740 may include, for example, a kernel 1741, a middleware 1743, an application programming interface (API) 1745, and/or an application program (or "application") 1747. At least a part of the kernel 1741, the middleware 1743, or the API 1745 may be referred to as an operating system (OS).

The kernel 1741 may control or manage, for example, system resources (e.g., the bus 1710, the processor 1720, or the memory 1730) which are used for executing operations or functions implemented in other programs (e.g., the middleware 1743, the API 1745, or the application program 1747). Additionally, the kernel 1741 may provide an interface capable of controlling or managing system resources by accessing individual elements of the electronic device 1701 from the middleware 1743, the API 1745, or the application program 1747.

The middleware 1743 may perform a mediating function to allow, for example, the API 1745 or the application program 1747 to communicate and exchange data with the kernel 1741. Additionally, in relation to one or more work requests received from the application program 1747, the middleware 1743 may perform, for example, a control operation (e.g., scheduling or load balancing) for the work request by using a method of designating or arranging the priority, which permits the electronic device 1701 to use a system resource (e.g., the bus 1710, the processor 1720, or the memory 1730), into at least one application of the application program 1747. For example, middleware 1743 may perform scheduling or load balancing operations for the one or more work requests by processing the one or more work requests in accordance with the priority.

The API 1745 may be, for example, an interface for controlling a function which is provided from the kernel 1741 or the middleware 1743. For example, the API 1745 may include at least one interface or function (e.g., instructions) for file control, window control, or character control.

The I/O interface 1750 may act, for example, an interface capable of conveying instructions or data, which are input from a user or another external device, to another element (or other elements) of the electronic device 1701. Additionally, the I/O interface 1750 may output instructions or data, which are received from another element (or other elements) of the electronic device 1701, to a user or another external device.

The display 1760 may include, for example, a liquid crystal display (LCD), a light emitting diode (LED), an organic LED (OLED) display, a microelectromechanical system (MEMS) display, or an electronic paper. The display 1760 may display, for example, diverse contents (e.g., text, image, video, icon, or symbol) to a user. The display 1760 may include a touch screen, and for example may receive an input of touch, gesture, approach, or hovering which is made by using an electronic pen or a part of a user's body.

The communication interface 1770 may set, for example, a communication condition between the electronic device 1701 and an external electronic device (e.g., a first external electronic device 1702, a second external electronic device 1704, or a server 1706). For example, the communication interface 1770 may communicate with an external electronic device (e.g., the second external electronic device 1704 or the server 1706) in connection with the network 1762 through wireless communication or wired communication 1764.

Wireless communication, for example, as cellular communication protocol, may include cellular communication using at least one of LTE, LTE-advanced (LTE-A), code division multiple access (CDMA), wideband CDMA (WCDMA), universal mobile telecommunications system (UNITS), wireless broadband (WiBro), or global system for mobile communication (GSM). According to an embodiment, the wireless communication may include, for example, at least one of Wi-Fi, BT, Bluetooth low energy (BLE), Zigbee, NFC, MST, RF, body area network (BAN), or GNSS.

The wired communication may include, for example, at least one of universal serial bus (USB), high definition multimedia interface (HDMI), recommended standard 232 (RS-232), or plain old telephone service (POTS). The network 1762 may include a telecommunication network, for example, at least one of a computer network (e.g., local area network (LAN) or wireless LAN (WLAN)), Internet, or a telephone network.

Each of the first and second external electronic devices 1702 and 1704 may be the same with or different from the electronic device 1701. According an embodiment, the server 1706 may include a group of one or more servers. According to various embodiments, all or a part of operations executed in the electronic device 1701 may be executed in another one or a plurality of electronic devices (e.g., the electronic device 1702 or 1704, or the server 1706). According to an embodiment, in case there is a need of performing a function or service automatically or by a request for the electronic device 1701, the electronic device 1701 may request at least a part of the function or service, additionally or instead of executing by itself, from another device (e.g., the electronic device 1702 or 1704, or the server 1706). Such another device (e.g., the electronic device 1702 or 1704, or the sever 1706) may execute such a requested or additional function and then transfer a result of the execution of the function. The electronic device 1701 may process a received result, as it is or additionally, to provide the requested function or service. To this end, for example, it may be available to adopt a cloud computing, distributed computing, or client-server computing technique.

Figure 18:
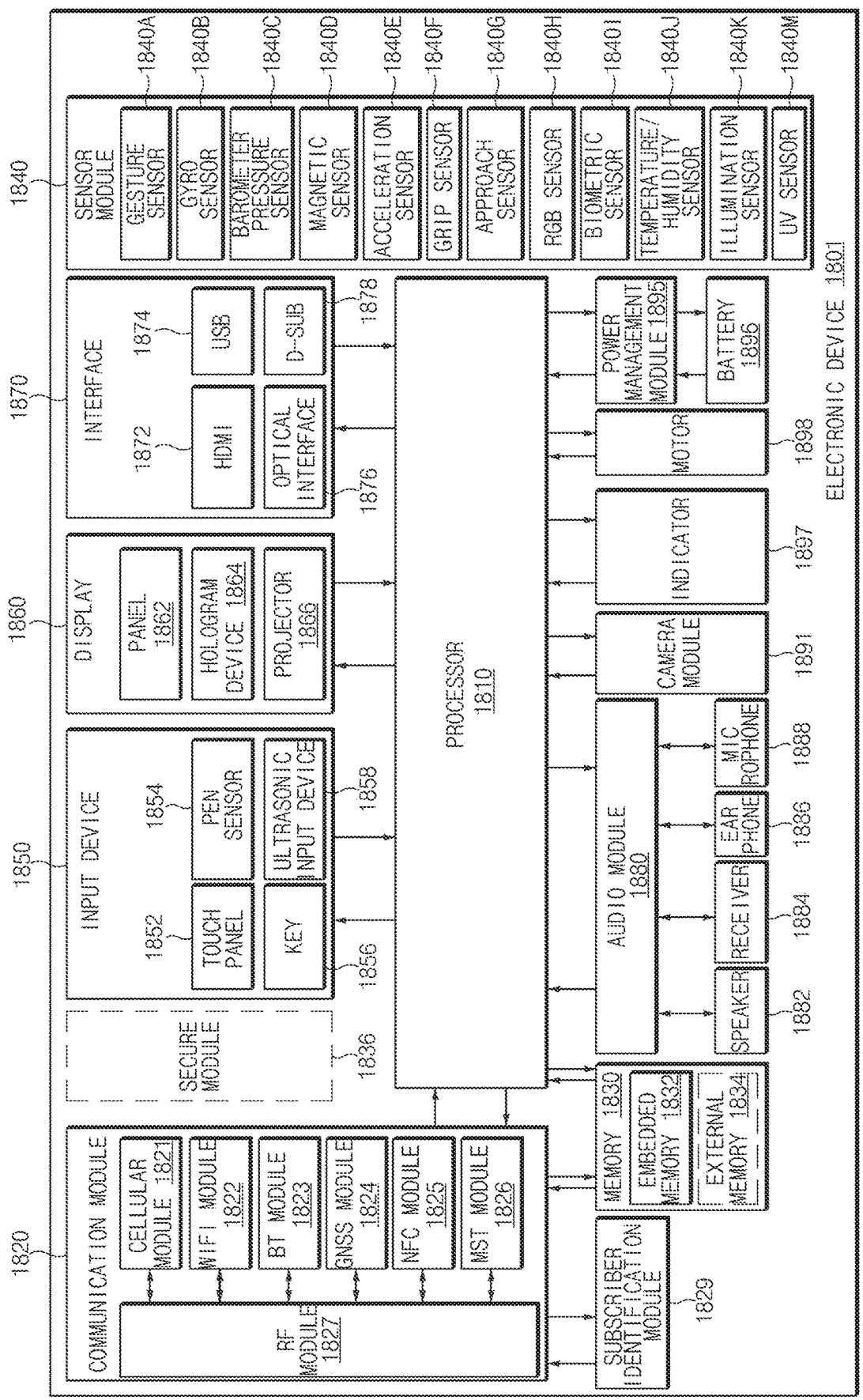
FIG. 18 is a block diagram illustrating an electronic device according to various embodiments of the present disclosure.

FIG. 18 is a block diagram illustrating an electronic device according to various embodiments of the present disclosure.

Referring to FIG. 18, the electronic device 1801 may include, for example, all or a part of elements of the electronic device 100 shown in FIG. 1. The electronic device 1801 may include one or more AP 1810, a communication module 1820, a subscriber identification module (SIM) card 1824, a memory 1830, a sensor module 1840, an input unit 1850, a display 1860, an interface 1870, an audio module 1880, a camera module 1891, a power management module 1895, a battery 1896, an indicator 1897, or a motor 1898.

The processor (AP) 1810 may drive an OS or an application to control a plurality of hardware or software elements connected to the processor 1810 and may process and compute a variety of data including multimedia data. The processor 1810 may be implemented with a SoC, for example. According to an embodiment, the processor 1810 may further include a GPU and/or an image signal processor (ISP). The processor 1810 may even include at least a part of the elements shown in FIG. 18. The processor 1810 may process instructions or data, which are received from at least one of other elements (e.g., a nonvolatile memory), and then store diverse data into such a nonvolatile memory.

The communication module 1820 may have a configuration the same with or similar to the communication circuit 1770 of FIG. 17. The communication module 1820 may include a cellular module 1821, a Wi-Fi module 1822, a BT module 1823, a GNSS module 1824 (e.g., GPS module, Glonass module, Beidou module, or Galileo module), an NFC module 1825, an MST module 1826, and a RF module 1827.

The cellular module 1821 may provide voice call, video call, a character service, or an Internet service through a communication network. According to an embodiment, the cellular module 1821 may perform discrimination and authentication of an electronic device within a communication network using a SIM (e.g., a SIM card) 1829. According to an embodiment, the cellular module 1821 may perform at least a portion of functions that the processor 1810 provides. According to an embodiment, the cellular module 1821 may include a CP.

Each of the Wi-Fi module 1822, the BT module 1823, the GNSS module 1824, the NFC module 1825, or the MST module 1826 may include, for example, a processor for processing data sent or received through a corresponding module. In some embodiments, at least a part (e.g., two or more elements) of the cellular module 1821, the Wi-Fi module 1822, the BT module 1823, the GNSS module 1824, the NFC module 1825, or the MST module 1826 may be included within one IC or an IC package.

The RF module 1827 may transmit or receive, for example, communication signals (e.g., RF signals). The RF module 1827 may include a transceiver, a PAM, a frequency filter, a LNA, or an antenna. According to another embodiment, at least one of the cellular module 1821, the Wi-Fi module 1822, the BT module 1823, the GNSS module 1924, the NFC module 1825, or the MST module 1826 may transmit or receive an RF signal through a separate RF module.

The SIM 1829 may include, for example, a card, which has a SIM, and/or an embedded SIM, and include unique identifying information (e.g., integrated circuit card identifier (ICCID)) or subscriber information (e.g., integrated mobile subscriber identify (IMSI)).

The memory 1830 may include, for example, an embedded memory 1832 or an external memory 1834. For example, the embedded memory 1832 may include, for example, at least one of a volatile memory (e.g., a dynamic random access memory (DRAM), a static RAM (SRAM), a synchronous dynamic RAM (SDRAM), etc.), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.), a hard drive, or solid state drive (SSD).

The external memory 1834 may further include a flash drive, for example, a compact flash (CF), a secure digital (SD), a micro-SD, a mini-SD, an extreme digital (xD), or a memory stick. The external memory 934 may be functionally and/or physically connected with the electronic device 901 through various interfaces.

A security module 1836, as a module including a storage space which is higher than the memory 1830 in security level, may be a circuit for securing safe data storage and protected execution circumstances. The security module 1836 may be implemented with an additional circuit and may include an additional processor. The security module 1836, for example, may be present in an attachable smart chip or SD card, or may include an embedded secure element (eSE) which is installed in a fixed chip. Additionally, the security module 1836 may be driven in another OS which is different from the OS of the electronic device 1801. For example, the security module 1836 may operate based on a java card open platform (JCOP) OS. The sensor module 1840 may measure, for example, a physical quantity, or detect an operation state of the electronic device 1801, to convert the measured or detected information to an electric signal. The sensor module 1840 may include at least one of a gesture sensor 1840A, a gyro sensor 1840B, a barometer pressure sensor 1840C, a magnetic sensor 1840D, an acceleration sensor 1840E, a grip sensor 1840F, a proximity sensor 1840G, a color sensor 1840H (e.g., red, green, and blue (RGB) sensor), a biometric sensor 1840I, a temperature/humidity sensor 1840J, an illuminance sensor 1840K, or an ultraviolet (UV) sensor 1840M. Additionally or alternatively, though not shown, the sensor module 1840 may further include an E-nose sensor, an electromyography sensor (EMG) sensor, an electroencephalogram (EEG) sensor, an electrocardiogram (ECG) sensor, an infrared (IR) sensor, an iris sensor, or a fingerprint sensor, for example. The sensor module 1840 may further include a control circuit for controlling at least one or more sensors included therein. In some embodiments, the electronic device 1801 may further include a processor, which is configured to control the sensor module 1840, as a part or additional element, thus controlling the sensor module 1840 while the processor 1810 is in a sleep state.

The input unit 1850 may include, for example, a touch panel 1852, a (digital) pen sensor 1854, a key 1856, or an ultrasonic input unit 1858. The touch panel 1852 may recognize, for example, a touch input using at least one of a capacitive type, a resistive type, an infrared type, or an ultrasonic wave type. Additionally, the touch panel 1052 may further include a control circuit. The touch panel 1852 may further include a tactile layer to provide a tactile reaction for a user.

The (digital) pen sensor 1854 may be a part of the touch panel 1852, or a separate sheet for recognition. The key 1856, for example, may include a physical button, an optical key, or a keypad. The ultrasonic input unit 1858 may detect an ultrasonic wave, which is generated from an input instrument, through a microphone (e.g., a microphone 1888) to confirm data corresponding to the detected ultrasonic signal.

The display 1860 may include a panel 1862, a hologram unit 1864, or a projector 1866. The panel 1862, for example, may be implemented to be flexible, transparent, or wearable. The panel 1862 and the touch panel 1852 may be implemented in one module. The hologram unit 1864 may show a three-dimensional image in a space using interference of light. The projector 1866 may project light onto a screen to display an image. The screen, for example, may be positioned in the inside or outside of the electronic device 1801. According to an embodiment, the display 1860 may further include a control circuit for controlling the panel 1862, the hologram unit 1864, or the projector 1866.

The interface 1870 may include, for example, an HDMI 1872, an USB 1874, an optical interface 1876, or a D-sub-miniature (D-sub) 1878. The interface 1870 may include, for example, the communication interface 1770 shown in FIG. 17. Additionally or alternatively, the interface 1870, for example, may include a mobile high definition link (MHL) interface, an SD card/multi-media cared (MMC) interface, or an Infrared data association (IrDA) standard interface.

The audio module 1880 may convert a sound and an electric signal in dual directions. At least one element of the audio module 1880 may process sound information that is input or output through the speaker 1882, the receiver 1884, the earphone 1886, or the microphone 1888.

The camera module 1891 may be a unit which is capable of taking a still picture and a moving picture. According to an embodiment, the camera module 1891 may include one or more image sensors (e.g., a front sensor or a rear sensor), a lens, an ISP, or a flash (e.g., an LED or a xenon lamp).

The power management module 1895 may manage, for example, power of the electronic device 1801. The power management module 1895 may include, for example, a power management integrated circuit (PMIC) a charger IC, or a battery or fuel gauge. The PMIC may operate in wired and/or wireless charging mode. A wireless charging mode may include, for example, diverse types of magnetic resonance, magnetic induction, or electromagnetic wave. For the wireless charging, an additional circuit, such as a coil loop circuit, a resonance circuit, or a rectifier, may be further included therein. The battery gauge, for example, may measure a remnant of the battery 1896, a voltage, a current, or a temperature during charging. The battery 1896 may measure, for example, a residual, a voltage on charge, a current, or temperature thereof. The battery 996 may include, for example, a rechargeable battery and/or a solar battery.

The indicator 1897 may display the following specific state of the electronic device 1801 or a part (e.g., the processor 1810) thereof: a booting state, a message state, or a charging state. The motor 1898 may convert an electric signal into mechanical vibration and generate a vibration or haptic effect. Although not shown, the electronic device 1801 may include a processing unit (e.g., a GPU) for supporting a mobile TV. The processing unit for supporting the mobile TV, for example, may process media data that is based on the standard of digital multimedia broadcasting (DMB), digital video broadcasting (DVB), or media flow (MediaFlo™).

Figure 19:
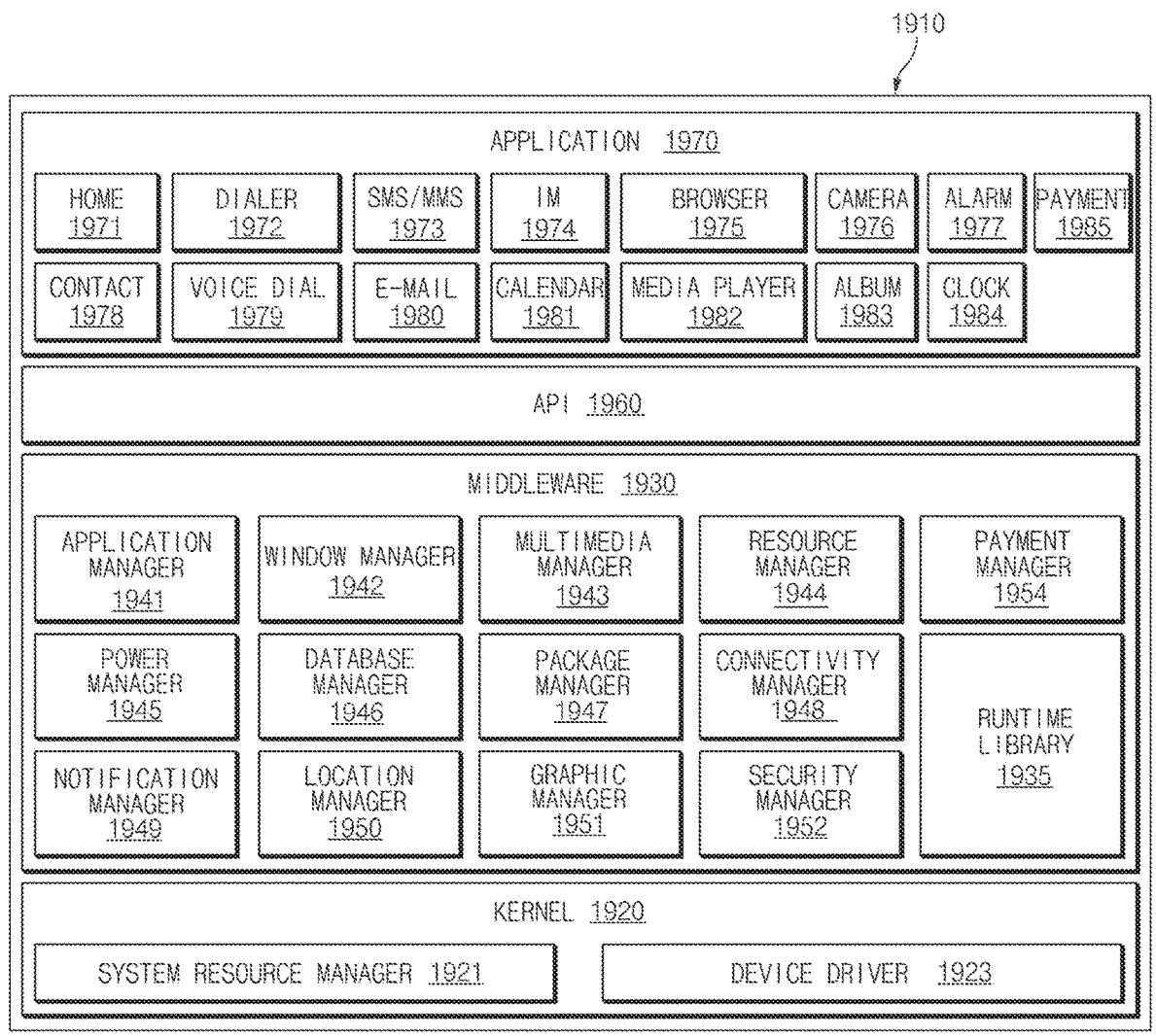
FIG. 19 is a block diagram illustrating a program module according to various embodiments of the present disclosure.

FIG. 19 is a block diagram illustrating a program module according to various embodiments of the present disclosure.

According to an embodiment, referring to FIG. 19, the program module 1910 may include an OS to control resources relevant to an electronic device (e.g., an electronic device 1901), and/or diverse applications (e.g., an application program 1747) driven on the OS. The OS may be, for example, android, iOS, windows, symbian, tizen, or bada.

The program module may include a kernel 1920, a middleware 1930, and an API 1960. At least a part of the program module 1910 may be preloaded on an electronic device, or may be downloadable from a server (e.g., the electronic devices 1702 or 1704, or the server 1706).

The kernel 1920 (e.g., the kernel 1741) may include, for example, a system resource manager 1921 or a device driver 1923. The system resource manager 1921 may perform control, allocation, or retrieval of system resources. According to an embodiment, the system resource manager 1921 may include a process managing part, a memory managing part, or a file system managing part. The device driver 1923 may include, for example, a display driver, a camera driver, a BT driver, a common memory driver, an USB driver, a keypad driver, a Wi-Fi driver, an audio driver, or an inter-process communication (IPC) driver.

The middleware 1930 may provide, for example, a function necessary for the application 1970 in common, or provide diverse functions to the application 1970 through the API 1960 to allow the application 1970 to efficiently use limited system resources of the electronic device. According to an embodiment, the middleware 1930 (e.g., the middleware 1743) may include at least one of a runtime library 1935, an application manager 1941, a window manager 1942, a multimedia manager 1943, a resource manager 1944, a power manager 1945, a database manager 1946, a package manager 1947, a connectivity manager 1948, a notification manager 1949, a location manager 1950, a graphic manager 1951, a security manager 1952, or a payment manager 1954.

The runtime library 1935 may include, for example, a library module which is used by a compiler to adding a new function through a programming language while the application 1970 is being executed. The runtime library 1935 may perform I/O management, memory management, or capacities about arithmetic functions.

The application manager 1941 may manage, for example, a life cycle of at least one application of the application 1970. The window manager 1942 may manage a graphical user interface (GUI) resource which is used in a screen. The multimedia manager 1943 may identify a format necessary for playing diverse media files, and perform an encoding or decoding work for media files by using a codec suitable for the format. The resource manager 1944 may manage resources such as a storage space, memory, or source code of at least one application of the application 1970.

The power manager 1945, for example, may operate with a basic input/output system (BIOS) to manage a battery or power, and provide power information for an operation of an electronic device. The database manager 1946 may generate, search, or modify a database which is to be used in at least one application of the application 1970. The package manager 1947 may install or update an application which is distributed in a form of package file.

The connectivity manager 1948 may manage, for example, wireless connection such as Wi-Fi or BT. The notification manager 1949 may display or notify an event such as arrival message, promise, or proximity notification in a mode that does not disturb a user. The location manager 1950 may manage location information of an electronic device. The graphic manager 1951 may manage a graphic effect that is provided to a user, or manage a user interface relevant thereto. The security manager 1952 may provide a general security function necessary for system security or user authentication. According to an embodiment, if an electronic device (e.g., the electronic device 1901) includes a telephony function, the middleware 1930 may further includes a telephony manager for managing a voice or image call function of the electronic device.

The middleware 1930 may include a middleware module to form a combination of diverse functions of the above-described elements. The middleware 1930 may provide a specialized module by a kind of OS in purpose of offering differentiated functions. Additionally, the middleware 1930 may remove a part of the preexisting elements, dynamically, or add a new element thereto.

The API 1960 (e.g., the API 1745) may be, for example, a set of programming functions, and may be provided in a configuration which is variable depending on an OS. For example, if an OS is the android or the iOS, it may be permissible to provide one API set per platform. If an OS is the tizen, it may be permissible to two or more API sets per platform.

The application 1970 (e.g., the application 1747) may include, for example, one or more applications capable of providing functions for a home 1971, a dialer 1972, a short message service (SMS)/multimedia messaging service (MIMS) 1973, an instant message (IM) 1974, a browser 1975, a camera 1976, an alarm 1977, a contact 1978, a voice dial 1979, an e-mail 1980, a calendar 1981, a media player 1982, am album 1983, a timepiece/clock 1984, or for offering health care (e.g., measuring an exercise quantity or blood sugar) or environmental information (e.g., atmospheric pressure, humidity, or temperature) and a payment application 1985.

According to an embodiment, the application 1970 may include an application (hereinafter, referred to as "information exchanging application" for descriptive convenience) to support information exchange between the electronic device (e.g., the electronic device 1701) and an external electronic device (e.g., the electronic device 1702 or 1704). The information exchanging application may include, for example, a notification relay application for sending specific information to the external electronic device, or a device management application for managing the external electronic device.

For example, the information exchanging application may include a function of sending notification information, which arise from other applications (e.g., the applications for SMS/MMS, e-mail, health care, or environmental information), to an external electronic device (e.g., the electronic device 1702 or 1704). Additionally, the information exchanging application, for example, may receive notification information from an external electronic device and may provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1702 or 1704) which communicates with the electronic device 100, an application operating in the external electronic device, or service (e.g., call service or message service) provided from the external electronic device.

According to an embodiment, the application 1970 may include an application (e.g., a health care application) which is assigned thereto in accordance with a property (e.g., a property of a mobile medical device as a kind of electronic device) of the external electronic device (e.g., the electronic device 1702 or 1704, or the server 1706). According to an embodiment, the application 1970 may include may include a preloaded application or a third party application which is downloadable from a server. The titles of elements of the program module 1910 according to the illustrated embodiment may be modifiable depending on kinds of OSs.

According to various embodiments, at least a part of the program module 1910 may be implemented in software, firmware, hardware, or at least two or more combinations among them. At least a part of the program module 910, for example, may be implemented (e.g., executed) by a processor (e.g., the processor 120 of FIG. 1). At least a part of the program module 1910 may include, for example, a module, a program, routine, a set of instructions, or a process for performing one or more functions.

An electronic device according to various embodiments of the present disclosure may include a communication circuit configured to communicate with an external device, and a processor configured to control the communication circuit, wherein the communication circuit may include a coil antenna including a first coil of a loop type that rotates with a number of times in a direction, and a second coil of a loop type that is extended from the first coil, configured to rotate with a number of times in a direction, and spaced from the first coil by a distance equal to or larger than a specific distance, and an antenna control circuit electrically connected with the coil antenna and configured to transmit or receive a signal with the coil antenna.

According to various embodiments, the first coil and the second coil may be arranged on the same surface, wherein the second coil may be configured to form a loop, which is smaller than a loop formed by the first coil, in the loop formed by the first coil.

According to various embodiments, the first coil and the second coil are the same in a rotation direction.

According to various embodiments, the first coil and the second coil may be the same in a number of rotation times.

According to various embodiments, the first coil and the second coil may be arranged to face each other on different surfaces.

According to various embodiments, the first coil may be arranged at the front surface of the electronic device, and the second coil may be arranged at the rear surface of the electronic device.

According to various embodiments, the first coil and the second coil may be different in a rotation direction.

According to various embodiments, the communication circuit may further include a metallic antenna connected with opposite ends of the first coil, which is divided into two parts, and configured to form a loop together with the first coil.

According to various embodiments, the metallic antenna may be a multiple band antenna, and the communication circuit may further include an RF circuit to communicate with an external device through the metallic antenna.

According to various embodiments, the communication circuit may further include a first switch placed between the second coil and the antenna control circuit and configured to switch a signal that is transmitted or received between the second looped coil and the antenna control circuit, and a second switch placed between the metallic antenna and the RF circuit and configured to switch a signal that is transmitted or received between the metallic antenna and the RF circuit.

According to various embodiments, the communication circuit may further include a third filter placed between the second coil and the antenna control circuit and configured to filter a signal that is transmitted or received between the second coil and the antenna control circuit, and a fourth filter between the metallic antenna and the RF circuit and configured to filter a signal that is transmitted or received between the metallic antenna and the RF circuit.

According to various embodiments, the coil antenna may be configured to communicate with the external device in NFC under control of the antenna control circuit.

According to various embodiments, the coil antenna may further include a first connection part connected with an end of the first coil, and a second connection part connected with an end of the second coil, wherein the antenna control circuit may be configured to transmit or receive a signal with the coil antenna through the first connection part or the second connection part.

According to various embodiments, the communication circuit may further include a signal processing circuit configured to process a signal received from the antenna control circuit and to supply a signal to the coil antenna through the first connection part or the second connection part.

According to various embodiments, the signal processing circuit may include a filter circuit configured to filter a portion of a frequency band of a signal received from the antenna control circuit, and a frequency control circuit configured to modify a resonance frequency of a signal received from the filter.

An antenna structure according to various embodiments of the present disclosure may include at least one printed circuit board, and a coil antenna arranged on the at least one printed circuit board, wherein the coil antenna may include a first coil of a loop type configured to rotate with a number of rotation times in a direction, and a second coil of a loop type extended from the first coil, configured to rotate with a number of rotation times in a direction, and spaced from the first coil by a distance equal to or larger than a specific distance.

According to various embodiments, the first coil and the second coil may be arranged on the same printed circuit board, and the second coil may be configured to form a loop, which is smaller than a loop formed by the first coil, in the loop formed by the first coil.

An electronic device according to various embodiments of the present disclosure may include a housing including a first surface toward a first direction and a second surface toward a second direction that is opposite to the first direction, at least one communication circuit included in the housing, a wireless charging circuit included in the housing, a printed circuit board included in the housing and configured to have a surface parallel with the first surface or the second surface; a first coil having a first diameter in view of the top of the second surface and including at least one turn, a second coil configured to have a second diameter, which is smaller than the first diameter, in view of the top of the second surface, arranged in an interior surrounded by the turns of the first coil, and configured to include at least one turn, and a third coil configured to have a third diameter, which is smaller than the second diameter, in view of the top of the second surface, arranged in an interior surrounded by the turns of the second coil, and configured to include at least one turn, wherein the first coil, the second coil, and the third coil may be arranged in or adjacent to the printed circuit board, wherein the first coil and the third coil may be electrically connected with the communication circuit, and wherein the second coil is electrically connected with the wireless charging circuit.

According to various embodiments, the communication circuit may be configured to transmit or receive an electromagnetic wave of a first frequency through the first coil and/or the third coil, and the wireless charging circuit may be configured to transmit and/or receive an electromagnetic wave of a second frequency, which is smaller than the first frequency, through the second coil.

According to various embodiments, the first frequency may be ranged in 13 to 15 MHz, and the second frequency may be ranged in 100 to 270 KHz.

According to various embodiments, the communication circuit may be based on an NFC protocol.

According to various embodiments, the wireless charging circuit may include a part which is implemented based on a protocol of WPC or PMA.

According to various embodiments, the electronic device may further include a fourth coil configured to have a fourth diameter, which is smaller than the first diameter but larger than the second diameter, in view of the top of the second surface, arranged in an interior surrounded by the turn of the first coil, and configured to include at least one turn.

According to various embodiments, the fourth coil may be electrically connected with the communication circuit.

According to various embodiments, the communication circuit may include a first circuit configured to transmit and/or receive an electromagnetic wave of a first frequency using the first coil and/or the third coil, and a second circuit configured to transmit and/or receive an electromagnetic wave and/or a magnetic wave of a second frequency, which is lower than the first frequency, through the first circuit and the fourth coil, wherein the wireless charging circuit may transmit and/or receive an electromagnetic wave of a third frequency, which is lower than the first frequency and the second frequency, through the second coil.

According to various embodiments, the second circuit may be configured to generate an electromagnetic wave and/or a magnetic wave, which are/is emulated based at least partially on payment information, through the fourth coil.

According to various embodiments, the electronic device may further include a user interface, a memory, and a processor electrically connected with the user interface, the memory, and the communication circuit, wherein the memory may store instructions, on execution, that allows the processor to receive a user input through the user interface, to select payment information based at least partially on the received user input, to generate a signal of a selected wave based on the payment information, and to transmit the generated signal to the outside through the communication circuit and the fourth coil.

According to various embodiments, the electronic device may further include a display, a memory, and a processor electrically connected with the display, the memory, and the communication circuit, wherein the memory may store instructions, on execution, that allows the processor to use the communication circuit and the first coil and/or the third coil for communication with an external radio frequency identification (RFID) device.

According to various embodiments, the electronic device may further include a display, a memory, and a processor electrically connected with the display, the memory, and the wireless charging circuit, wherein the memory may store instructions, on execution, that allows the processor to display whether power is wirelessly transmitted and/or received through the wireless charging circuit and the second coil on the display.

According to various embodiments, the printed circuit board may include an FPCB including a plurality of layers, and a least a part of the first to third coils may be formed in at least one of the plurality of layers.

Each of elements described throughout the present disclosure may be formed of one or more components. Titles of elements corresponding thereto may be variable depending on types of electronic device. In various embodiments, an electronic device may be formed including at least one of elements described herein, excluding a part of elements, or including an additional element. Additionally, by combining parts of elements of an electronic device according to various embodiments into one entity, it may be permissible to perform the functions which are involved in the elements before the combination.

The term "module" used for the present disclosure, for example, may mean a unit including one of hardware, software, and firmware or a combination of two or more thereof. A "module", for example, may be interchangeably used with terminologies such as a unit, logic, a logical block, a component, a circuit, etc. The "module" may be a minimum unit of a component integrally configured or a part thereof. The "module" may be a minimum unit performing one or more functions or a portion thereof. The "module" may be implemented mechanically or electronically. For example, the "module" according to various embodiments of the present disclosure may include at least one of an application-specific integrated circuit (ASIC) chip performing certain operations, a field-programmable gate arrays (FPGAs), or a programmable-logic device, those of which have been known or to be developed in the future.

A module or a programming module according to various embodiments of the present disclosure may include at least one of the above elements, or a part of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added thereto.

According to various embodiments of the present disclosure, it may be accomplishable to improve communication performance with an external device and to lessen inconvenience due to communication inability by expanding a communication distance, range, and functionality of an antenna included in an electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
 a near field communication circuit;
 a wireless charging circuit;
 a magnetic secure transmission circuit;
 a near field communication coil electrically connected with the near field communication circuit, the near field communication coil including a first coil and a second coil;
 a wireless charging coil electrically connected with the wireless charging circuit, the wireless charging coil including a third coil; and
 a magnetic secure transmission coil electrically connected with the magnetic secure transmission circuit, the magnetic secure transmission coil including a fourth coil,
 wherein, when viewed in a direction perpendicular to a rear surface of the portable communication device, the first coil is surrounded by the second coil, the third coil is located between the first coil and the second coil, and at least a portion of the fourth coil is located between the third coil and the second coil.

2. The portable communication device of claim 1, further comprising a flexible substrate in or on which the near field communication coil, the wireless charging coil, and the magnetic secure transmission coil are formed,
wherein the flexible substrate is disposed between a battery and a rear cover of the portable communication device.

3. The portable communication device of claim 1, further comprising at least one of a camera, a microphone, an earphone, or a display including a touch screen.

4. The portable communication device of claim 1, wherein the magnetic secure transmission circuit is configured to transmit an electromagnetic signal corresponding to payment information via the magnetic secure transmission coil.

5. The portable communication device of claim 4,
wherein the near field communication circuit is configured to transmit another electromagnetic signal having a first frequency via the near field communication coil, and
wherein the magnetic secure transmission circuit is further configured to transmit the electromagnetic signal having a second frequency lower than the first frequency via the magnetic secure transmission coil.

6. The portable communication device of claim 1, wherein the first coil includes a first number of turns, the second coil includes a second number of turns, the third coil includes a third number of turns, and the fourth coil includes a fourth number of turns larger than the first number or the second number.

7. The portable communication device of claim 6, wherein the first number is same as the second number.

8. The portable communication device of claim 1, wherein the magnetic secure transmission coil includes a fifth coil which is not concentric with the fourth coil.

9. The portable communication device of claim 8, wherein at least a portion of the fifth coil is intersected with at least a portion of the second coil.

10. The portable communication device of claim 1, further comprising a flexible substrate in or on which the near field communication coil, the wireless charging coil, and the magnetic secure transmission coil are formed.

11. The portable communication device of claim 10,
wherein the flexible substrate includes a first substrate layer and a second substrate layer located above the first substrate layer, and
wherein one of the first coil, the second coil, the third coil, and the fourth coil is formed in or on the first substrate layer, and another of the first coil, the second coil, the third coil, and the fourth coil is formed in or on the second substrate layer.

12. The portable communication device of claim 10,
wherein the flexible substrate includes a first terminal and a second terminal electrically connected with the near field communication circuit, and
wherein a first portion of the near field communication coil extended from the first coil is in contact with the first terminal, and a second portion of the near field communication coil extended from the second coil is in contact with the second terminal.

13. The portable communication device of claim 10, further comprising a ferrite sheet attached to the flexible substrate.

14. The portable communication device of claim 13, further comprising a graphite sheet attached to the ferrite sheet, wherein the ferrite sheet is located between the flexible substrate and the graphite sheet.

15. The portable communication device of claim 1, wherein the first coil is looped such that a first current flowing on the first coil is to have a first rotation direction, and the second coil is looped such that a second current flowing on the second coil has a second rotation direction same as the first rotation direction.

16. A portable communication device comprising:
a near field communication circuit;
a wireless charging circuit;
a magnetic secure transmission circuit;
a near field communication coil electrically connected with the near field communication circuit, the near field communication coil including a first coil and a second coil;
a wireless charging coil electrically connected with the wireless charging circuit, the wireless charging coil including a third coil; and
a magnetic secure transmission coil electrically connected with the magnetic secure transmission circuit, the magnetic secure transmission coil including a fourth coil,
wherein, when viewed in a direction perpendicular to a rear surface of the portable communication device, the first coil is surrounded by the second coil, and the third coil and the fourth coil are located between the first coil and the second coil.

17. The portable communication device of claim 16, further comprising a flexible substrate in or on which the near field communication coil, the wireless charging coil, and the magnetic secure transmission coil are formed, and
wherein the flexible substrate is disposed between a battery and a rear cover of the portable communication device.

18. The portable communication device of claim 16, wherein the fourth coil is located between the third coil and the second coil.

19. The portable communication device of claim 16, wherein the magnetic secure transmission circuit is configured to transmit an electromagnetic signal corresponding to payment information via the magnetic secure transmission coil.

20. The portable communication device of claim 19,
wherein the near field communication circuit is configured to transmit another electromagnetic signal having a first frequency via the near field communication coil, and
wherein the magnetic secure transmission circuit is further configured to transmit the electromagnetic signal having a second frequency lower than the first frequency via the magnetic secure transmission coil.

21. The portable communication device of claim 16, wherein the first coil includes a first number of turns, the second coil includes a second number of turns, the third coil includes a third number of turns, and the fourth coil includes a fourth number of turns larger than the first number or the second number.

22. The portable communication device of claim 21, wherein the first number is same as the second number.

23. The portable communication device of claim 16, wherein the magnetic secure transmission coil includes a fifth coil which is not concentric with the fourth coil.

24. The portable communication device of claim 23, wherein at least a portion of the fifth coil is intersected with at least a portion of the second coil.

\* \* \* \* \*